US009666140B2

(12) United States Patent
Nakata et al.

(10) Patent No.: US 9,666,140 B2
(45) Date of Patent: May 30, 2017

(54) DISPLAY DEVICE AND METHOD FOR DRIVING SAME

(71) Applicant: Sharp Kabushiki Kaisha, Osaka-shi, Osaka (JP)

(72) Inventors: Jun Nakata, Osaka (JP); Masami Ozaki, Osaka (JP); Akihisa Iwamoto, Osaka (JP); Tomohiko Nishimura, Osaka (JP); Kohji Saitoh, Osaka (JP); Masaki Uehata, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 43 days.

(21) Appl. No.: 14/650,908

(22) PCT Filed: Dec. 6, 2013

(86) PCT No.: PCT/JP2013/082791
§ 371 (c)(1),
(2) Date: Jun. 10, 2015

(87) PCT Pub. No.: WO2014/092011
PCT Pub. Date: Jun. 19, 2014

(65) Prior Publication Data
US 2015/0332632 A1    Nov. 19, 2015

(30) Foreign Application Priority Data

Dec. 14, 2012    (JP) .................................. 2012-274025

(51) Int. Cl.
*G09G 3/34* (2006.01)
*G09G 3/36* (2006.01)
(Continued)

(52) U.S. Cl.
CPC ......... *G09G 3/3406* (2013.01); *G06K 9/0051* (2013.01); *G09G 3/2092* (2013.01);
(Continued)

(58) Field of Classification Search
CPC ............... G09G 3/3677; G09G 3/3696; G09G 2330/027; G09G 3/3674; G09G 2310/0289
See application file for complete search history.

(56) References Cited

U.S. PATENT DOCUMENTS

2004/0036669 A1    2/2004  Yanagi et al.
2007/0001981 A1*   1/2007  Tahata ................. G09G 3/3674
                                                 345/98
(Continued)

FOREIGN PATENT DOCUMENTS

JP    2004-078124 A    3/2004
JP    2008-009367 A    1/2008
(Continued)

OTHER PUBLICATIONS

Official Communication issued in International Patent Application No. PCT/JP2013/082791, mailed on Mar. 18, 2014.

*Primary Examiner* — Robert Michaud
(74) *Attorney, Agent, or Firm* — Keating & Bennett, LLP

(57) ABSTRACT

The invention provides a gate-in-panel display device capable of preventing deterioration of thin-film transistors during pause drive, as well as a method for driving the same. At the end of a drive period, an active clear signal is provided to thin-film transistors in unit circuits, each thin-film transistor being connected to either a first or second node at a gate terminal, thereby bringing the thin-film transistors into ON state. As a result, the voltages of the first and second nodes are set to a reference voltage. Thus, even if a pause period lasts for a long period of time, the gate terminals of the thin-film transistors are not subjected to sustained voltage application, leading to no threshold voltage shifts.

15 Claims, 12 Drawing Sheets

(51) Int. Cl.
*G06K 9/00* (2006.01)
*G09G 3/20* (2006.01)
(52) U.S. Cl.
CPC ......... *G09G 3/3607* (2013.01); *G09G 3/3618* (2013.01); *G09G 3/3659* (2013.01); *G09G 3/3674* (2013.01); *G09G 3/3677* (2013.01); *G09G 3/3685* (2013.01); *G09G 2310/0286* (2013.01); *G09G 2310/0289* (2013.01); *G09G 2310/062* (2013.01); *G09G 2310/063* (2013.01); *G09G 2310/065* (2013.01); *G09G 2320/0233* (2013.01); *G09G 2320/062* (2013.01); *G09G 2320/0666* (2013.01); *G09G 2330/022* (2013.01); *G09G 2340/0435* (2013.01)

(56) References Cited

U.S. PATENT DOCUMENTS

| | | |
|---|---|---|
| 2008/0012797 A1 | 1/2008 | Kil |
| 2012/0218245 A1* | 8/2012 | Morii ................... G09G 3/3677 345/211 |
| 2014/0111495 A1* | 4/2014 | Iwase ................... G09G 3/3677 345/211 |

FOREIGN PATENT DOCUMENTS

| | | |
|---|---|---|
| WO | 2011/055584 A1 | 5/2011 |
| WO | 2012/161042 A1 | 11/2012 |

\* cited by examiner

DISPLAY DEVICE AND METHOD FOR DRIVING SAME

TECHNICAL FIELD

The present invention relates to a gate-in-panel display device capable of pause drive and a method for driving the same.

BACKGROUND ART

The mobility of amorphous silicon used in a-SiTFT liquid crystal panels (i.e., liquid crystal panels in which thin-film transistors have semiconductor layers made from amorphous silicon) is low. Accordingly, in conventional liquid crystal display devices, a gate driver for driving gate bus lines is mounted around the liquid crystal panel as a semiconductor chip or a semiconductor device. However, in recent years, gate-in-panels, which are liquid crystal panels on which gate drivers are formed from amorphous silicon, have been actively developed in order to achieve compact liquid crystal display devices at reduced production cost. The gate-in-panel is also referred to as a panel with a monolithic gate driver, a panel without a gate driver, or a gate driver built in a panel.

Moreover, liquid crystal display devices to be mounted in compact and lightweight electronic devices are required to consume less power. One drive method for reducing power consumption in the liquid crystal display device is a drive method called "pause drive", which alternates between a drive period, in which gate bus lines are scanned for signal voltage writing, and a pause period, in which the writing is paused by leaving all of the gate bus lines unscanned. The pause drive achieves low power consumption in the liquid crystal display device by pausing the operation of a gate driver and/or a source driver during the pause period. Accordingly, by performing pause drive on a gate-in-panel liquid crystal display device, it is rendered possible to produce a compact and low power liquid crystal display device at low production cost.

In relevance to the present invention, Japanese Laid-Open Patent Publication Nos. 2004-78124 and 2008-9367 are known. Japanese Laid-Open Patent Publication No. 2004-78124 discloses a liquid crystal display device in which pause drive is performed. Moreover, Japanese Laid-Open Patent Publication No. 2008-9367 describes a gate-in-panel liquid crystal display device in which a gate driver is formed on a liquid crystal panel.

CITATION LIST

Patent Documents

Patent Document 1: Japanese Laid-Open Patent Publication No. 2004-78124
Patent Document 2: Japanese Laid-Open Patent Publication No. 2008-9367

SUMMARY OF THE INVENTION

Problems to be Solved by the Invention

FIG. 12 is a graph showing the characteristics of the thin-film transistor of a conventional gate-in-panel liquid crystal display device where pause drive is performed. A problem with the gate-in-panel liquid crystal display device that is caused by performing pause drive will be described with reference to FIG. 12. The transistor characteristics shown in FIG. 12 are those of an n-channel thin-film transistor with a semiconductor layer made with an indium gallium zinc oxide (In—Ga—Zn—O). For this thin-film transistor, when the gate voltage is increased, the drain current (off-current) is approximately at $1.00 \times 10^{-14}$ A at the beginning of pause drive, and barely increases until the gate voltage approaches 0V, as indicated by the dotted line, but the drain current (on-current) rises sharply when the gate voltage is around 0V. However, in the case where pause drive continues for a long period of time, the off-current is approximately at $1.00 \times 10^{-14}$ A and barely increases until the gate voltage approaches 5V, but the on-current rises sharply when the gate voltage is around 5V. In this manner, when pause drive continues for a long period of time, a problem occurs where the threshold voltage shifts. Using a thin-film transistor with such characteristics to configure a gate driver results in a problem where the gate driver does not operate normally when pause period continues for a long period of time. Note that the on-current and the off-current of the thin-film transistor vary on the order of several digits. More specifically, the on-current varies in the range of from $1.0 \times 10^{-8}$ A to $1.0 \times 10^{-4}$ A, and the off-current varies in the range of from $1.0 \times 10^{-14}$ A to $1.0 \times 10^{-10}$ A.

The following is a conceivable cause for the above problem. Each stage of the shift register included in the gate driver has a node that is brought into a floating state during a pause period. Conceivably, if the pause period starts with a constant voltage being applied to the node, any thin-film transistor whose gate terminal is connected to the node might deteriorate because such a thin-film transistor continues to have the voltage applied to the gate terminal for a long period of time.

Furthermore, Japanese Laid-Open Patent Publication Nos. 2004-78124 and 2008-9367 neither disclose nor suggest deterioration of the thin-film transistor due to the application of a constant voltage during the pause period, nor even any countermeasures against such deterioration.

Therefore, an objective of the present invention is to provide a gate-in-panel display device capable of preventing deterioration of thin-film transistors during pause drive, as well as a method for driving the same.

Means for Solving the Problems

A first aspect of the present invention is directed to a display device performing pause drive which alternates between a drive period and a pause period in predetermined cycles, the display device including:
  a plurality of scanning signal lines as well as a plurality of data signal lines crossing the scanning signal lines;
  a plurality of pixel forming portions arranged in a matrix corresponding to respective intersections of the scanning signal lines and the data signal lines;
  a scanning signal line driver circuit including a shift register configured sequentially to output active scanning signals to the scanning signal lines by sequentially bringing a plurality of cascaded unit circuits having first and second states into the first state;
  a data signal line driver circuit configured to apply image signals to the data signal lines and thereby writing the image signals to the pixel forming portions that are connected to scanning signal lines being selected;
  a power supply circuit including a first voltage generation portion configured to generate a high-level voltage and a second voltage generation portion configured to generate a low-level voltage;

a display control circuit, in accordance with a first control signal and image data, configured to generate a second control signal and a third control signal, the first control signal and the image data being externally transmitted, the second control signal controlling the operation of the scanning signal line driver circuit, the third control signal controlling the operation of the data signal line driver circuit; and a level shifter configured to output the second control signal provided by the display control circuit to the scanning signal line driver circuit after adjusting the level of the second control signal in accordance with the high-level voltage provided by the first voltage generation portion and the low-level voltage provided by the second voltage generation portion, wherein, each of the unit circuits includes a plurality of nodes and a plurality of thin-film transistors connected to the nodes at gate terminals, the nodes being brought into a floating state during the pause period, and the level shifter outputs the active scanning signals, such that the scanning signal line driver circuit applies the active scanning signals sequentially to the scanning signal lines, during the drive period, and then provides an active clear signal generated on the basis of the high-level voltage and the low-level voltage, simultaneously to the unit circuits, thereby setting voltages of the nodes to a reference voltage before a transition to the pause period.

According to a second aspect of the present invention, in the first aspect of the invention, the nodes include first and second nodes, the thin-film transistors include output thin-film transistors configured to output the active scanning signals and discharge thin-film transistors configured to set voltages of the first nodes to the reference voltage, the output thin-film transistors being connected to the first nodes at the gate terminals, the discharge thin-film transistors being connected to the second nodes at the gate terminals, and the active clear signal causes the voltages of the first and second nodes included in the unit circuits to be simultaneously set to the reference voltage.

According to a third aspect of the present invention, in the second aspect of the invention, the unit circuits are sequentially brought into the first state in accordance with first and second clocks, the output thin-film transistors output the first clocks as the active scanning signals, the discharge thin-film transistors are brought into ON state when the second clocks become active, thereby setting the voltages of the first nodes to the reference voltage, and the level shifter outputs the first and second clocks during the drive period, such that the scanning signal line driver circuit applies the active scanning signals sequentially to the scanning signal lines.

According to a fourth aspect of the present invention, in the first aspect of the invention, the level shifter provides the second control signal to the scanning signal line driver circuit during the pause period, the second control signal being a low-level signal generated on the basis of the high- and low-level voltages respectively provided by the first and second voltage generation portions.

According to a fifth aspect of the present invention, in the fourth aspect of the invention, the level shifter generates the active clear signal in predetermined cycles during the pause period, and provides the active clear signal simultaneously to the unit circuits, thereby setting the voltages of the nodes to the reference voltage.

According to a sixth aspect of the present invention, in the first aspect of the invention, the power supply circuit causes the first and second voltage generation portions to operate and output the high- and low-level voltages to the level shifter during the drive period, and also stops the operation of the first voltage generation portion during the pause period while causing the second voltage generation portion to operate and output the low-level voltage to the level shifter, and the level shifter stops operating during the pause period, thereby fixing a voltage of a line connecting the level shifter and the scanning signal line driver circuit at low level.

According to a seventh aspect of the present invention, in the sixth aspect of the invention, the power supply circuit causes the first voltage generation portion to operate in predetermined cycles during the pause period, thereby providing the high-level voltage to the level shifter, and the level shifter sets the voltages of the nodes to the reference voltage during the pause period by providing the active clear signal simultaneously to the unit circuits, the active clear signal being a signal generated on the basis of the high- and low-level voltages respectively provided by the first and second voltage generation portions.

According to an eighth aspect of the present invention, in the first aspect of the invention, the display control circuit includes a selection signal generation portion configured to generate an active selection signal to cause the power supply circuit and the level shifter to operate, the selection signal generation portion outputs the active selection signal to the power supply circuit and the level shifter during the drive period, and also outputs an inactive selection signal during the pause period, the power supply circuit causes the first and second voltage generation portions to operate and output the high- and low-level voltages to the level shifter in accordance with the active selection signal during the drive period, and also stops the operation of the first voltage generation portion in accordance with the inactive selection signal during the pause period while causing the second voltage generation portion to operate and output the low-level voltage to the level shifter, and the level shifter stops operating during the pause period, thereby fixing a voltage of a line connecting the level shifter and the scanning signal line driver circuit at low level.

According to a ninth aspect of the present invention, in the eighth aspect of the invention, the selection signal generation portion generates the active selection signal in predetermined cycles during the pause period, and provides the active selection signal to the power supply circuit and the level shifter, and the level shifter sets the voltages of the nodes to the reference voltage during the pause period by providing the active clear signal simultaneously to the unit circuits, the active clear signal being a signal generated on the basis of the high- and low-level voltages respectively provided by the first and second voltage generation portions.

According to a tenth aspect of the present invention, in the first aspect of the invention, the pixel forming portions and the unit circuits include thin-film transistors whose semiconductor layers are made from In—Ga—Zn—O mainly composed of indium (In), gallium (Ga), zinc (Zn), and oxygen (O).

An eleventh aspect of the present invention is directed to a method for driving a display device performing pause drive which alternates between a drive period and a pause period in predetermined cycles, wherein, the display device including:
a plurality of scanning signal lines as well as a plurality of data signal lines crossing the scanning signal lines;
a plurality of pixel forming portions arranged in a matrix corresponding to respective intersections of the scanning signal lines and the data signal lines;
a scanning signal line driver circuit including a shift register configured sequentially to output active scanning signals to the scanning signal lines by sequentially bringing a plurality of cascaded unit circuits having first and second states into the first state in accordance with first and second clock signals;
a data signal line driver circuit configured to apply image signals to the data signal lines and thereby writing the image signals to the pixel forming portions that are connected to scanning signal lines being selected;
a power supply circuit including a first voltage generation portion configured to generate a high-level voltage and a second voltage generation portion configured to generate a low-level voltage;
a display control circuit, in accordance with a first control signal and image data, configured to generate a second control signal and a third control signal, the first control signal and the image data being externally transmitted, the second control signal controlling the operation of the scanning signal line driver circuit, the third control signal controlling the operation of the data signal line driver circuit; and
a level shifter configured to output the second control signal provided by the display control circuit to the scanning signal line driver circuit after adjusting the level of the second control signal in accordance with the high-level voltage provided by the first voltage generation portion and the low-level voltage provided by the second voltage generation portion,
each of the unit circuits includes a plurality of nodes and a plurality of thin-film transistors connected to the nodes at gate terminals, the nodes being brought into a floating state during the pause period, and
the method including the steps of:
applying the active scanning signals sequentially to the scanning signal lines during the drive period;
providing an active clear signal generated on the basis of the high- and low-level voltages outputted by the power supply circuit, simultaneously to the unit circuits at the end of the drive period, thereby simultaneously setting voltages of the nodes to a reference voltage; and transitioning to the pause period after the end of the drive period.

Effect of the Invention

In the first aspect of the present invention, an active clear signal is provided simultaneously to the unit circuits at the end of the drive period, so that the voltages of all nodes included in the unit circuits, which are brought into a floating state during the pause period, are set to the reference voltage. Thus, even if the pause period lasts for a long period of time, the gate terminals of the thin-film transistors connected to the nodes are not subjected to sustained voltage application, whereby deterioration of the thin-film transistors can be prevented from progressing.

In the second aspect of the present invention, an active clear signal is provided simultaneously to the unit circuits at the end of the drive period, so that the voltages of the first and second nodes in each unit circuit are set to the reference voltage. Thus, even if the pause period lasts for a long period of time, neither the gate terminal of the output thin-film transistor connected to the first node nor the gate terminal of the discharge thin-film transistor connected to the second node is subjected to sustained voltage application, whereby deterioration of the output thin-film transistor and the discharge thin-film transistor can be prevented from progressing.

In the third aspect of the present invention, the scanning line driver circuit is driven by two phases of clock, which renders it possible to prevent the configuration from becoming complex and thereby keep production cost low.

In the fourth aspect of the present invention, the level shifter provides the scanning signal line driver circuit with a second control signal which is at low level, during the pause period, and therefore, any node to be brought into a floating state during the pause period maintains the reference voltage, which is the voltage immediately before the transition to the pause period. Thus, even if the pause period lasts for a long period of time, the gate terminals of the thin-film transistors connected to such nodes are not subjected to sustained voltage application, whereby deterioration of the thin-film transistors can be prevented from progressing during the pause period.

In the fifth aspect of the present invention, an active clear signal is provided simultaneously to the unit circuits in predetermined cycles during the pause period. Accordingly, even if some noise occurs during the pause period, so that any of the nodes is subjected to voltage application, the voltages of the nodes, which are brought into a floating state during the pause period, are set to the reference voltage in predetermined cycles. Thus, even if the pause period lasts for a long period of time, the gate terminals of the thin-film transistors connected to the nodes are not subjected to sustained voltage application, whereby deterioration of the thin-film transistors can be prevented from progressing.

In the sixth aspect of the present invention, the first and second voltage generation portions of the power supply circuit operate during the drive period, so that the level shifter provides an active clear signal simultaneously to the unit circuits at the end of the drive period, thereby setting the voltages of the nodes, which are brought into a floating state during the pause period, to the reference voltage. Thus, even if the pause period lasts for a long period of time, the gate terminals of the thin-film transistors connected to the nodes are not subjected to sustained voltage application, whereby deterioration of the thin-film transistors can be prevented from progressing. Moreover, during the pause period, the first voltage generation portion stops operating, but the second voltage generation portion operates and outputs a low-level voltage. Accordingly, there is no switching noise generated by the operation of the first voltage generation portion, voltages caused by switching noise become less likely to be applied to the first and second nodes, whereby deterioration of both the output thin-film transistor and the discharge thin-film transistor can be more reliably prevented from progressing. In addition, the level shifter stops operating, and therefore, the low-level voltage outputted by the second voltage generation portion is applied to the line that connects the level shifter and the scanning signal line driver circuit, so that the voltage of the line is fixed at low level. As a result, little noise is introduced into the unit circuits through the line, and voltages caused by noise become less likely to be applied to the nodes, which are brought into a floating state during the pause period. Further, the first voltage generation portion of the power supply circuit stops operating during the pause period, whereby power consumption in the display device during the pause period can be reduced.

In the seventh aspect of the present invention, the power supply circuit provides a high-level voltage, along with a low-level voltage, to the level shifter in predetermined cycles during the pause period by causing the first voltage generation portion to operate, and the level shifter provides an active clear signal simultaneously to the unit circuits. As a result, even if some noise occurs during the pause period, so that the nodes in the unit circuits are subjected to voltage application, the voltages of the nodes, which are brought into a floating state during the pause period, are set to the reference voltage in predetermined cycles. Thus, effects similar to the effects achieved by the fifth aspect of the present invention can be achieved.

In the eighth aspect of the present invention, an active selection signal is provided to the power supply circuit and the level shifter during the drive period, so that the power supply circuit provides high- and low-level voltages to the level shifter. As a result, the level shifter provides an active clear signal simultaneously to the unit circuits at the end of the drive period, thereby setting the voltages of the nodes, which are brought into a floating state during the pause period, to the reference voltage. Thus, even if the pause period lasts for a long period of time, the gate terminals of the thin-film transistors connected to the nodes are not subjected to sustained voltage application, whereby deterioration of the thin-film transistors can be prevented from progressing. Moreover, the selection signal becomes inactive during the pause period, so that the first voltage generation portion stops operating, but the second voltage generation portion operates and outputs a low-level voltage. As a result, there is no switching noise generated by the operation of the first voltage generation portion, so that voltages caused by switching noise become less likely to be applied to the nodes, which are brought into a floating state during the pause period, whereby deterioration of the thin-film transistors can be more reliably prevented from progressing. In addition, the level shifter stops operating, and the low-level voltage outputted by the second voltage generation portion is applied to the line that connects the level shifter and the scanning signal line driver circuit, so that the voltage of the line is fixed at low level. Accordingly, little noise is introduced into the unit circuits through the line, and voltages caused by noise become less likely to be applied to the nodes, which are brought into a floating state during the pause period. Further, the first voltage generation portion of the power supply circuit stops operating during the pause period, whereby power consumption in the display device during the pause period can be reduced.

In the ninth aspect of the present invention, the selection signal generation portion outputs an active selection signal in predetermined cycles during the pause period, so that the power supply circuit provides a high-level voltage, along with a low-level voltage, to the level shifter by causing the first voltage generation portion to operate, and the level shifter provides an active clear signal to the nodes. As a result, even if some noise occurs during the pause period, so that the nodes of the unit circuits are subjected to voltage application, voltages of the nodes, which are brought into a floating state during the pause period, are set to the reference voltage in predetermined cycles. Thus, effects similar to the effects achieved by the fifth aspect of the present invention can be achieved.

In the tenth aspect of the present invention, the thin-film transistor whose semiconductor layer is made from In—Ga—Zn—O offers a less off-leakage current compared to the thin-film transistor whose semiconductor layer is made from amorphous silicon. Accordingly, by providing a high-level voltage to the gate terminals of the thin-film transistors connected to the nodes, which are brought into a floating state during the pause period, at the end of the drive period, the voltages of the nodes in which charges remain are reliably set to the reference voltage, thereby removing the remaining charges. Thus, deterioration of the thin-film transistors can be prevented from progressing during the pause period. Further, the scanning signal line driver circuit is configured using the thin-film transistors whose semiconductor layers are made from In—Ga—Zn—O, which makes it possible to realize a reduced frame area and high-definition image display.

The eleventh aspect of the present invention makes it possible to achieve effects similar to the effects achieved by the first aspect of the present invention.

MODES FOR CARRYING OUT THE INVENTION

Hereinafter, embodiments of the present invention will be described with reference to the accompanying drawings.

<1. First Embodiment>
<1.1 Overall Configuration>

Figure 1:
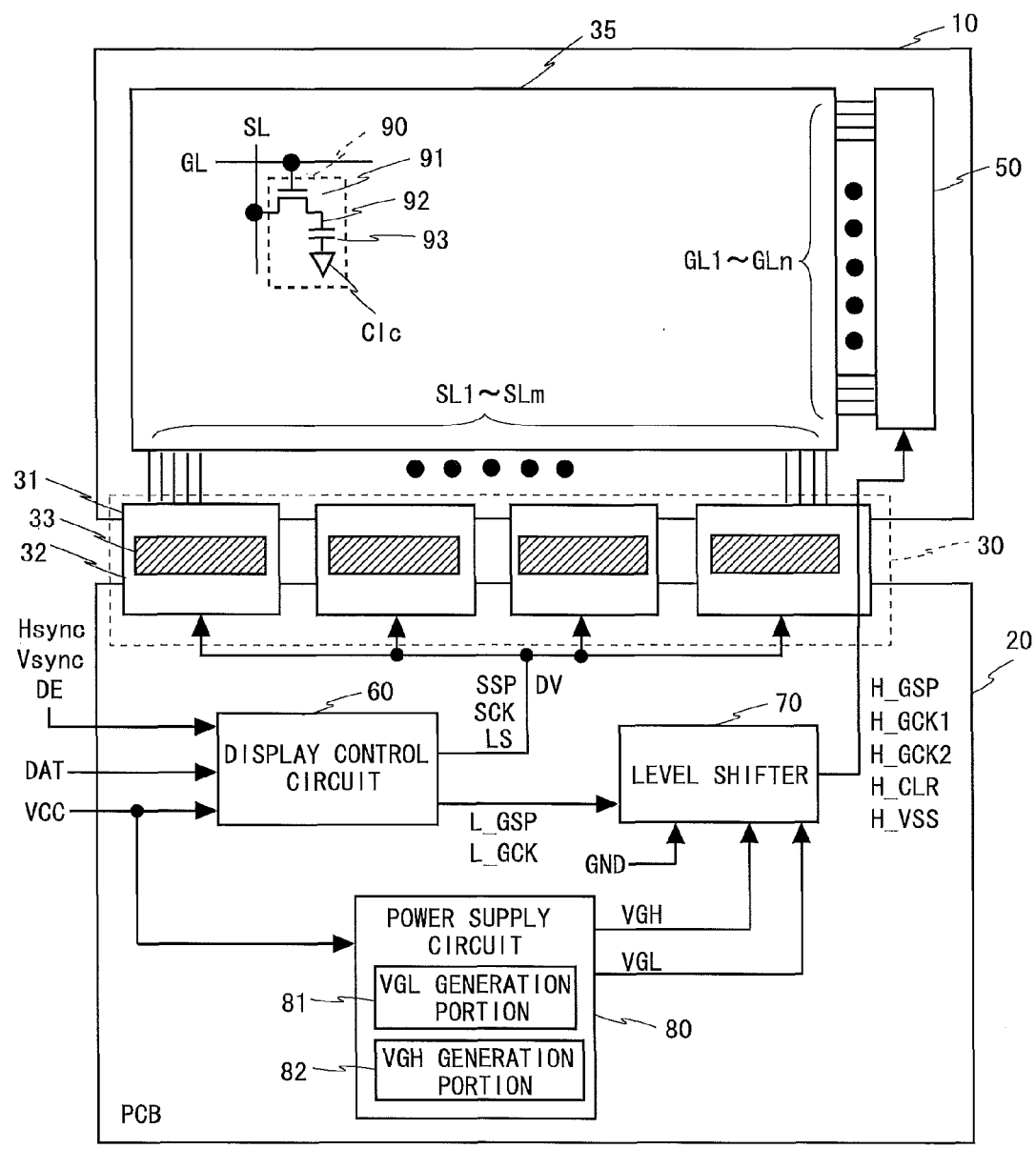
FIG. 1 is a block diagram illustrating the overall configuration of a gate-in-panel liquid crystal display device according to a first embodiment of the present invention.

A first embodiment of the present invention will be described. FIG. 1 is a block diagram illustrating the overall configuration of a gate-in-panel liquid crystal display device according to the first embodiment of the present invention. As shown in FIG. 1, the liquid crystal display device includes a liquid crystal panel 10 and a printed circuit board (also referred to as a "PCB") 20, which are connected by a plurality of TCPs (tape carrier packages) 31. The TCP 31 is a device in which a drive semiconductor chip 33 is bonded face down on a film 32, and the TCP 31 is connected at an input terminal to the wiring formed on the printed circuit board 20 and is also connected at an output terminal to the wiring formed on the liquid crystal panel 10. The TCPs 31 collectively function as a source driver (data signal line driver circuit) 30.

The liquid crystal panel 10 includes a display portion 35, which is an area for displaying an image, and a gate driver (scanning signal line driver circuit) 50. The display portion 35 includes a plurality (m) of source bus lines (data signal lines) SL1 to SLm and a plurality (n) of gate bus lines (scanning signal lines) GL1 to GLn, which are formed so as to cross each other, and the display portion 35 also includes a plurality (n×m) of pixel forming portions 90, which are formed in a matrix so as to correspond to respective intersections of the source bus lines SL1 to SLm and the gate bus lines GL1 to GLn. Note that FIG. 1 shows only one of the pixel forming portions 90. In addition, the gate driver 50 will be described later.

Each pixel forming portion 90 includes a thin-film transistor (TFT) 91, which is connected at a gate terminal to the gate bus line GL passing through its corresponding intersection and at a source terminal to the source bus line SL passing through the intersection, and also functions as a switching element, a pixel electrode 92 connected to a drain terminal of the thin-film transistor 91, a common electrode 93 provided commonly for the pixel forming portions 90, and a liquid crystal layer (not shown) provided commonly for the pixel forming portions 90 between the pixel electrode 92 and the common electrode 93. The pixel electrode 92 and the common electrode 93 form liquid crystal capacitance Clc, which serves as pixel capacitance. Note that the pixel capacitance is normally composed of the liquid crystal capacitance Clc and auxiliary capacitance provided in parallel to the liquid crystal capacitance Clc, but the auxiliary capacitance is not directly relevant to the present invention, and therefore, any description and illustration thereof will be omitted.

The printed circuit board 20 is provided with a display control circuit 60, a level shifter 70, and a power supply circuit 80. The display control circuit 60 receives image data DAT, timing signals, such as a horizontal synchronization signal Hsync and a vertical synchronization signal Vsync, and a power supply voltage VCC, which are transmitted externally, and the display control circuit 60 generates digital image signals DV, as well as control signals (third control signals) for controlling image display on the display portion 35, including a source start pulse signal SSP, a source clock signal SCK, and a latch strobe signal LS, and provides these signals to the TCPs 31, which collectively function as the source driver 30. Moreover, the display control circuit 60 generates control signals (first control signals), such as a gate start pulse signal L_GSP and a gate clock signal L_GCK, and provides them to the level shifter 70. Here, the gate start pulse signal L_GSP and the gate clock signal L_GCK are such signals whose high level is the same as the level of the externally provided power supply voltage VCC and whose low level is the same as the level of a ground voltage GND; to distinguish from a gate start pulse signal H_GSP and a gate clock signal H_GCK, which are level-shifted signals to be described later, the gate start pulse signal L_GSP and the gate clock signal L_GCK will be referred to as the initial gate start pulse signal L_GSP and the initial gate clock signal L_GCK, respectively. Note that level-shifted control signals, such as the gate start pulse signal H_GSP and the gate clock signal H_GCK, will also be referred to as second control signals.

The power supply circuit 80 includes a VGH generation portion (first voltage generation portion) 82 for generating a high-level voltage VGH and a VGL generation portion (second voltage generation portion) 81 for generating a low-level voltage VGL. The power supply circuit 80 generates the high-level voltage VGH and the low-level voltage VGL on the basis of the externally provided power supply voltage VCC, and provides them to the level shifter 70.

Figure 2:
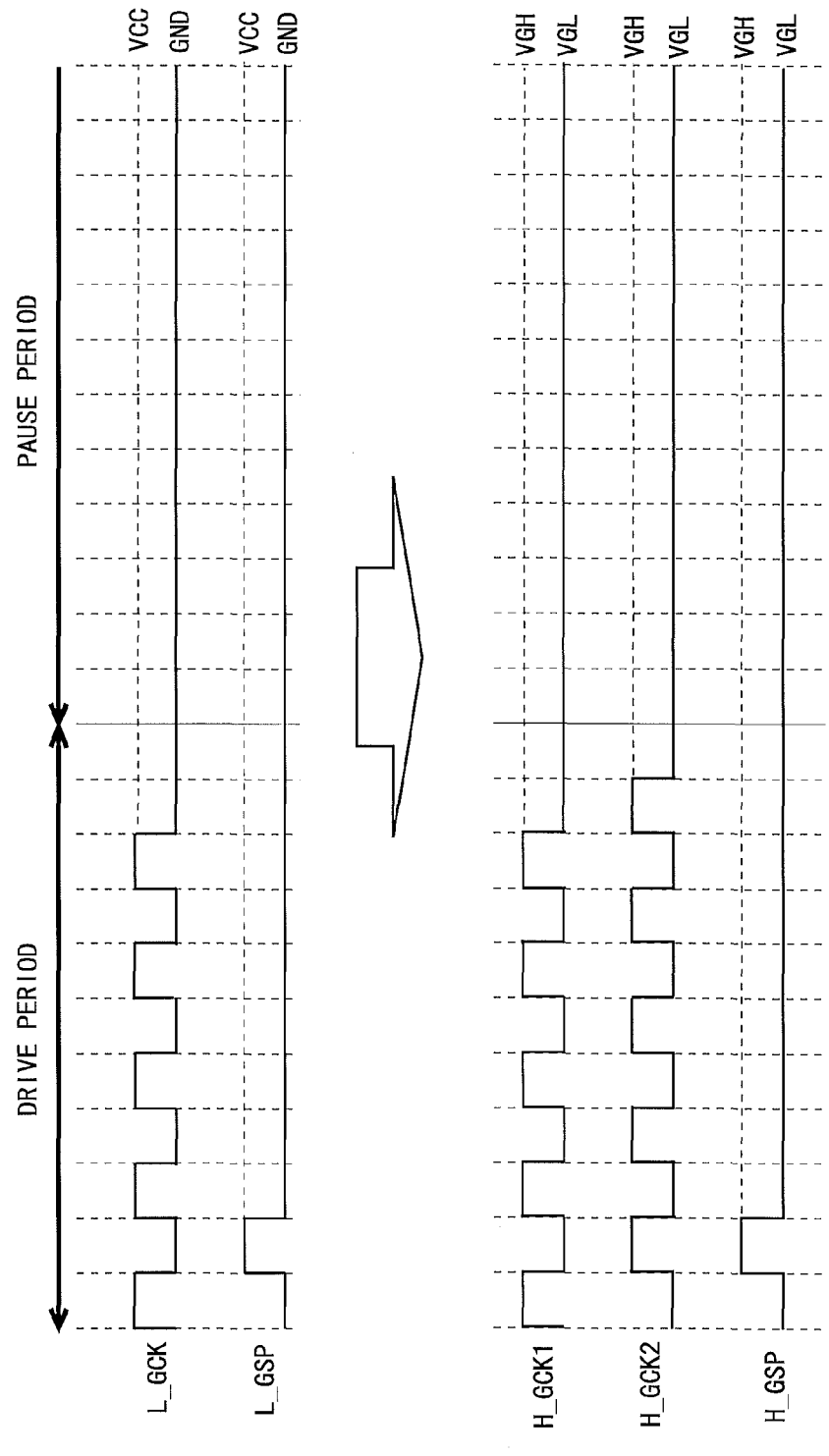
FIG. 2 provides signal waveform charts showing level shifting of an initial gate start pulse signal and an initial gate clock signal by a level shifter in the first embodiment.

FIG. 2 provides signal waveform charts showing level shifting of the initial gate start pulse signal L_GSP and the initial gate clock signal L_GCK by the level shifter 70. As shown in FIG. 2, the level shifter 70 shifts the level of the initial gate start pulse signal L_GSP and the initial gate clock signal L_GCK, which are provided by the display control circuit 60, to the high-level side using the voltages VGH and VGL provided by the power supply circuit 80. This converts the signals respectively into a gate start pulse signal H_GSP and first and second gate clock signals H_GCK1 and H_GCK2. As a result, the gate start pulse signal H_GSP and the first and second gate clock signals H_GCK1 and H_GCK2 are at the same level as the voltage VGH when they are at high level, and also at the same level as the voltage VGL when they are at low level.

Furthermore, the level shifter 70 generates a clear signal H_CLR and a reference voltage H_VSS, and provides them to the gate driver 50. The clear signal H_CLR is at the same level as the voltage VGH when it is at high level, and also at the same as the voltage VGL when it is at low level. Moreover, the reference voltage H_VSS is at the same level as the voltage VGL.

The source driver 30 receives the digital image signals DV, the source start pulse signal SSP, the source clock signal SCK, and the latch strobe signal LS, which are outputted by the display control circuit 60, and applies drive image signals S(1) to S(m) to the source bus lines SL1 to SLm. In this case, the source driver 30 sequentially holds the digital image signals DV, which specify the voltages to be applied to the source bus lines SL1 to SLm, at times of pulsation of the source clock signal SCK. Thereafter, the digital image signals DV are converted into analog voltages at times of pulsation of the latch strobe signal LS. The resultant analog voltages are applied simultaneously to all of the source bus lines SL1 to SLm as drive image signals S(1) to S(m).

The gate driver 50 repeats the operation of sequentially providing active output signals GOUT1 to GOUTn so as to be applied sequentially to the gate bus lines GL1 to GLn as scanning signals G(1) to G(n), in cycles of one vertical scanning period in accordance with the gate start pulse signal H_GSP and the gate clock signal H_GCK outputted by the level shifter 70.

The gate driver 50, along with the switching elements in the pixel forming portions 90, is formed on the liquid crystal panel 10 on which the display portion 35 is formed, using thin-film transistors whose semiconductor layers are formed with a silicon-based semiconductor, such as amorphous silicon, polysilicon, or microcrystalline silicon, or an oxide semiconductor. An example of the oxide semiconductor that can be used is In—Ga—Zn—O, which is mainly composed of indium (In), gallium (Ga), zinc (Zn), and oxygen (O).

In this manner, the drive image signals S(1) to S(m) are applied to the source bus lines SL1 to SLm, and the scanning signals G(1) to G(n) are applied to the gate bus lines GL1 to GLn, so that the display portion 35 displays an image based on the externally transmitted image data DAT.

<1.2 Configurations of the Gate Driver and the Shift Register>

Figure 3:
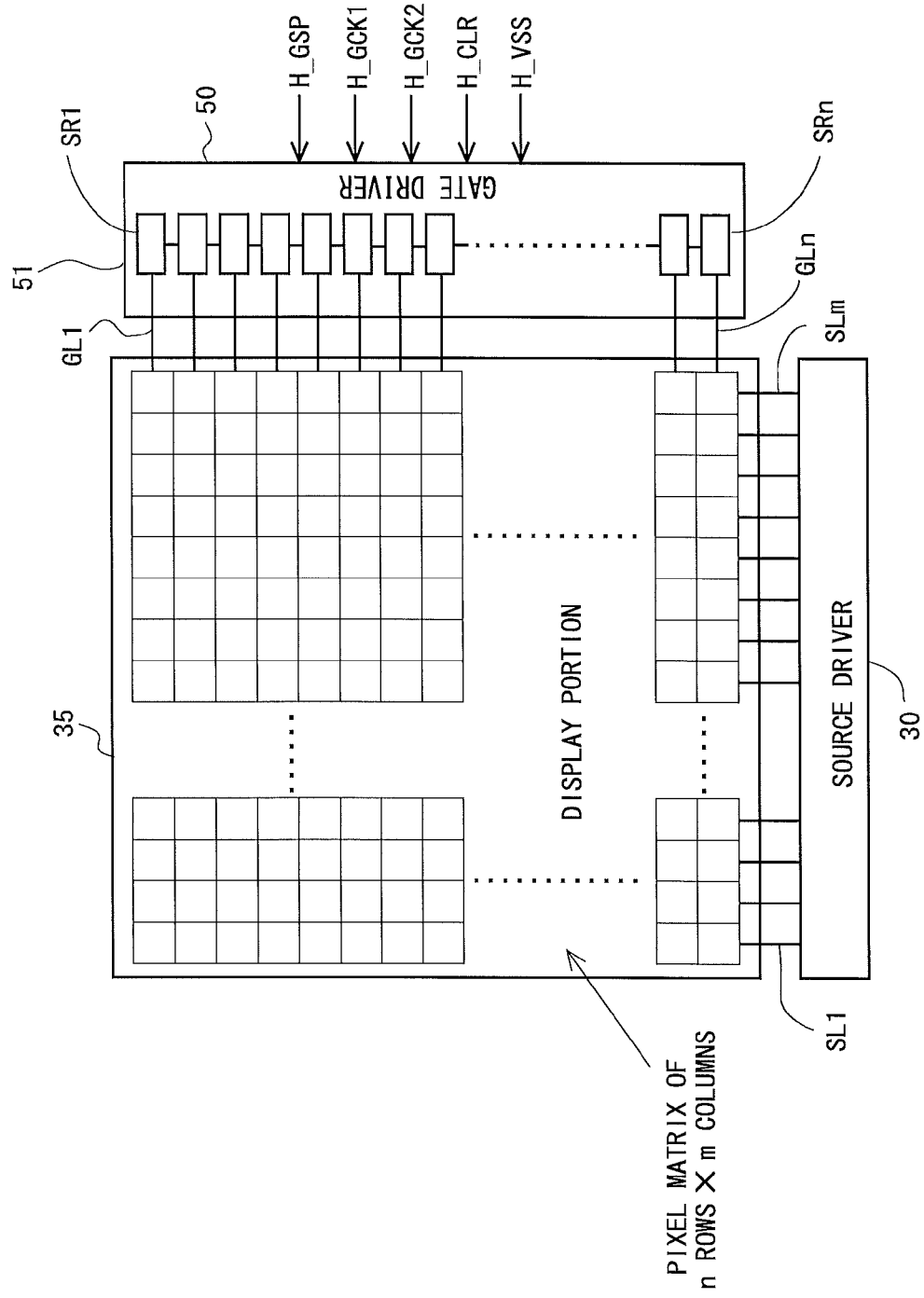
FIG. 3 is a block diagram illustrating the configuration of the liquid crystal display device in the first embodiment.

The configuration of the gate driver 50 included in the liquid crystal display device in the present embodiment will be described. FIG. 3 is a block diagram illustrating the configuration of the liquid crystal display device. As shown in FIG. 3, the gate driver 50 includes a shift register 51 consisting of n stages (unit circuits) SR1 to SRn. The display portion 35 has a pixel matrix of n rows ×m columns formed therein, and the n unit circuits SR1 to SRn are provided in one-to-one correspondence with the rows of the pixel matrix. The n unit circuits SR1 to SRn are cascaded and also respectively connected to the gate bus lines GL1 to GLn.

Figure 4:
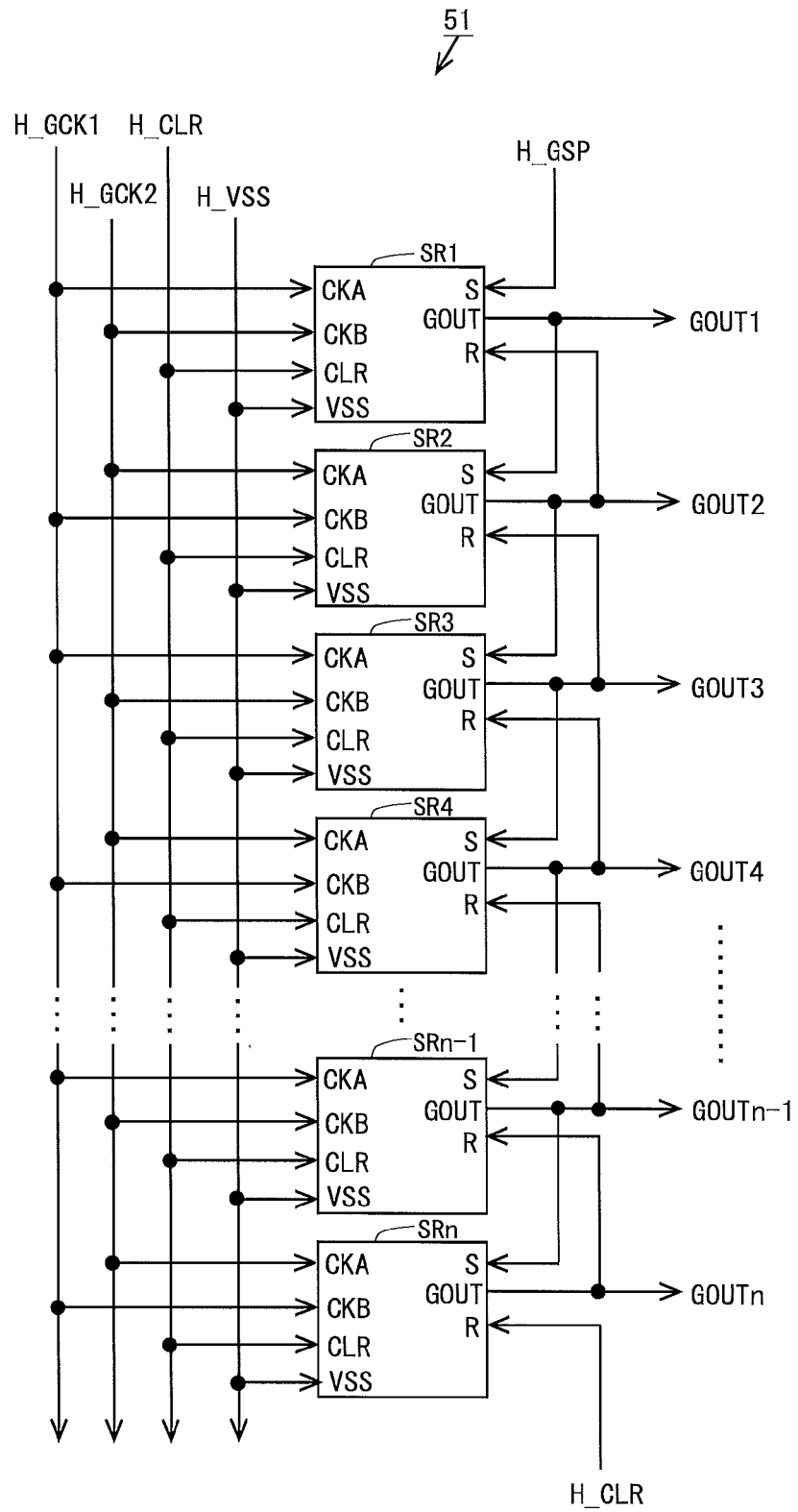
FIG. 4 is a block diagram illustrating the configuration of a shift register in the first embodiment.

FIG. 4 is a block diagram illustrating the configuration of the shift register 51. As described above, the shift register 51 consists of the n cascaded unit circuits SR1 to SRn. In the present embodiment, the shift register 51 is provided with the gate start pulse signal H_GSP, the clear signal H_CLR, and the two gate clock signals H_GCK1 and H_GCK2, as shown in FIG. 4. Each of the unit circuits SR1 to SRn has an input terminal at which to receive a clock signal CKA (referred to below as a "first clock") and a clock signal CKB (referred to below as a "second clock"), an input terminal at which to receive a set signal S, an input terminal at which to receive a reset signal R, an input terminal at which to receive a clear signal H_CLR, and an output terminal from which to output a first gate clock signal H_GCK1 as an output signal GOUT. The first gate clock signal H_GCK1 and the second gate clock signal H_GCK2 alternate between high and low levels in predetermined cycles, the high and low levels respectively being the same as the level of the voltage VGH and the level of the voltage VGL.

In the present embodiment, the first and second gate clock signals H_GCK1 and H_GCK2 are provided to the shift register 51 as follows. As for the first-stage unit circuit SR1, the first gate clock signal H_GCK1 and the second gate clock signal H_GCK2 are provided respectively as the first clock CKA and the second clock CKB. As for the second-stage unit circuit SR2, the first gate clock signal H_GCK1 and the second gate clock signal H_GCK2 are provided respectively as the second clock CKB and the first clock CKA. Such arrangements for the first-stage unit circuit SR1 and the second-stage unit circuit SR2 are repeated every two stages.

Furthermore, for each of the stages (i.e., each of the unit circuits) SR1 to SRn, an output signal GOUT derived from the previous stage is provided as a set signal S, and an output signal GOUT derived from the next stage is provided as a reset signal R. That is, the output signal GOUT provided by each of the unit circuits SR1 to SRn is provided not only to the gate bus line GL as a scanning signal G but also to the next stage as the set signal S and to the previous stage as the reset signal R. Note that as for the first-stage unit circuit SR1, since there is no preceding unit circuit, the gate start pulse signal H_GSP from the level shifter 70 is provided as the set signal S. Moreover, as for the n'th-stage unit circuit SRn, since there is no succeeding unit circuit, the clear signal H_CLR from the level shifter 70 is provided as the reset signal R.

<1.3 Operation of the Shift Register>

Figure 5:
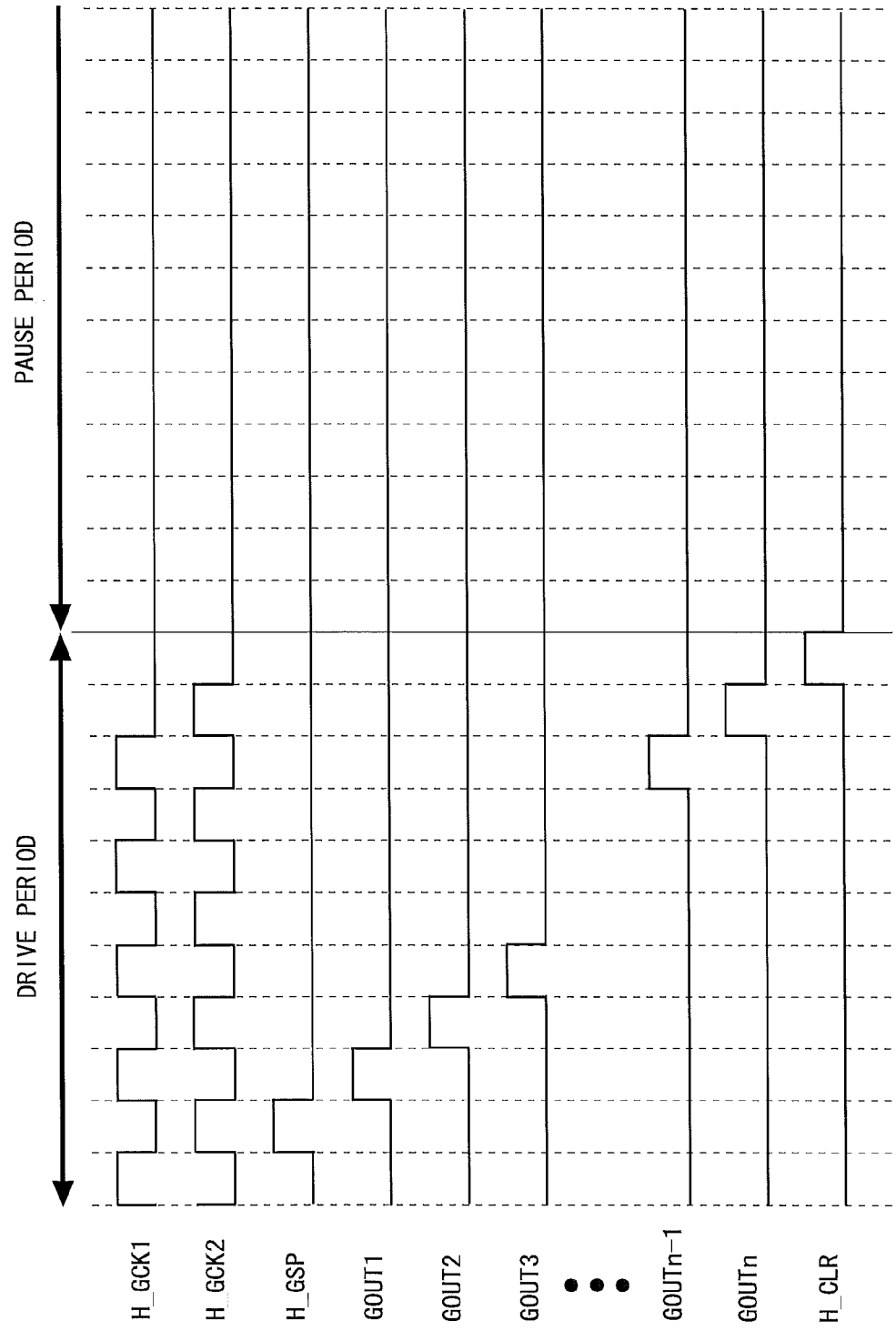
FIG. 5 provides signal waveform charts describing the operation of a gate driver in the first embodiment.

FIG. 5 provides signal waveform charts describing the operation of the gate driver 50. As shown in FIG. 5, the liquid crystal display device displays an image while alternating between a drive period and a pause period. The drive period will be described with reference to FIG. 5. In the case where the gate bus lines GL1 to GLn are scanned by means of the gate driver 50, the first and second gate clock signals H_GCK1 and H_GCK2 with the waveforms as shown in FIG. 5 are provided to the shift register 51. The second gate clock signal H_GCK2 is 180 degrees behind in phase relative to the first gate clock signal H_GCK1. Further, the gate start pulse signal H_GSP rises at the same time the second gate clock signal H_GCK2 rises. As a result, with reference to the time when the gate start pulse signal H_GSP rises, pulses of the two gate clock signals are generated in the order: the second gate clock signal H_GCK2 and then the first gate clock signal H_GCK1. In this manner, the gate driver 50 is driven by the two gate clock signals H_GCK1 and H_GCK2, which renders it possible to prevent the configuration from becoming complex and thereby keep production cost low for the gate driver 50.

When the pulse of the gate start pulse signal H_GSP is provided to the first-stage unit circuit SR1 of the shift register 51 as a set signal S, the pulse included in the gate start pulse signal H_GSP is transferred sequentially from the first-stage unit circuit SR1 to the n'th-stage unit circuit SRn in accordance with the first and second gate clock signals H_GCK1 and H_GCK2. As a result of the pulse transfer, the output signals GOUT1 to GOUTn provided by the unit circuits SR1 to SRn of the shift register 51 are sequentially brought into high level. The output signals GOUT1 to GOUTn from the unit circuits SR1 to SRn are respectively provided to the gate bus lines GL1 to GLn as scanning signals G(1) to G(n) to be sequentially brought into high level for one horizontal scanning period. Next, a high-level clear signal H_CLR is provided simultaneously to all of the unit circuits SR1 to SRn. As a result, the drive period ends.

Next, the pause period starts. In the pause period, the level shifter 70 provides the first gate clock signal H_GCK1, the second gate clock signal H_GCK2, and the gate start pulse signal H_GSP, which are at low level, to each of the unit circuits SR1 to SRn of the gate driver 50 in accordance with a low-level voltage VGL provided by the VGL generation portion 81 and a high-level voltage VGH provided by the VGH generation portion 82, so that the output signals GOUT1 to GOUTn from the unit circuits SR1 to SRn are at low level as well. Therefore, the scanning signals G(1) to G(n) to be provided to the gate bus lines GL1 to GLn, respectively, are also at low level. As will be described in detail later, at this time, the voltages of the nodes included in all of the unit circuits SR1 to SRn are at low level, and therefore, the clear signal H_CLR remains at low level. Once the pause period ends, the drive period starts again, and the liquid crystal display device repeats the operation described above.

<1.4 Configuration and Operation of the Unit Circuit>

Figure 6:
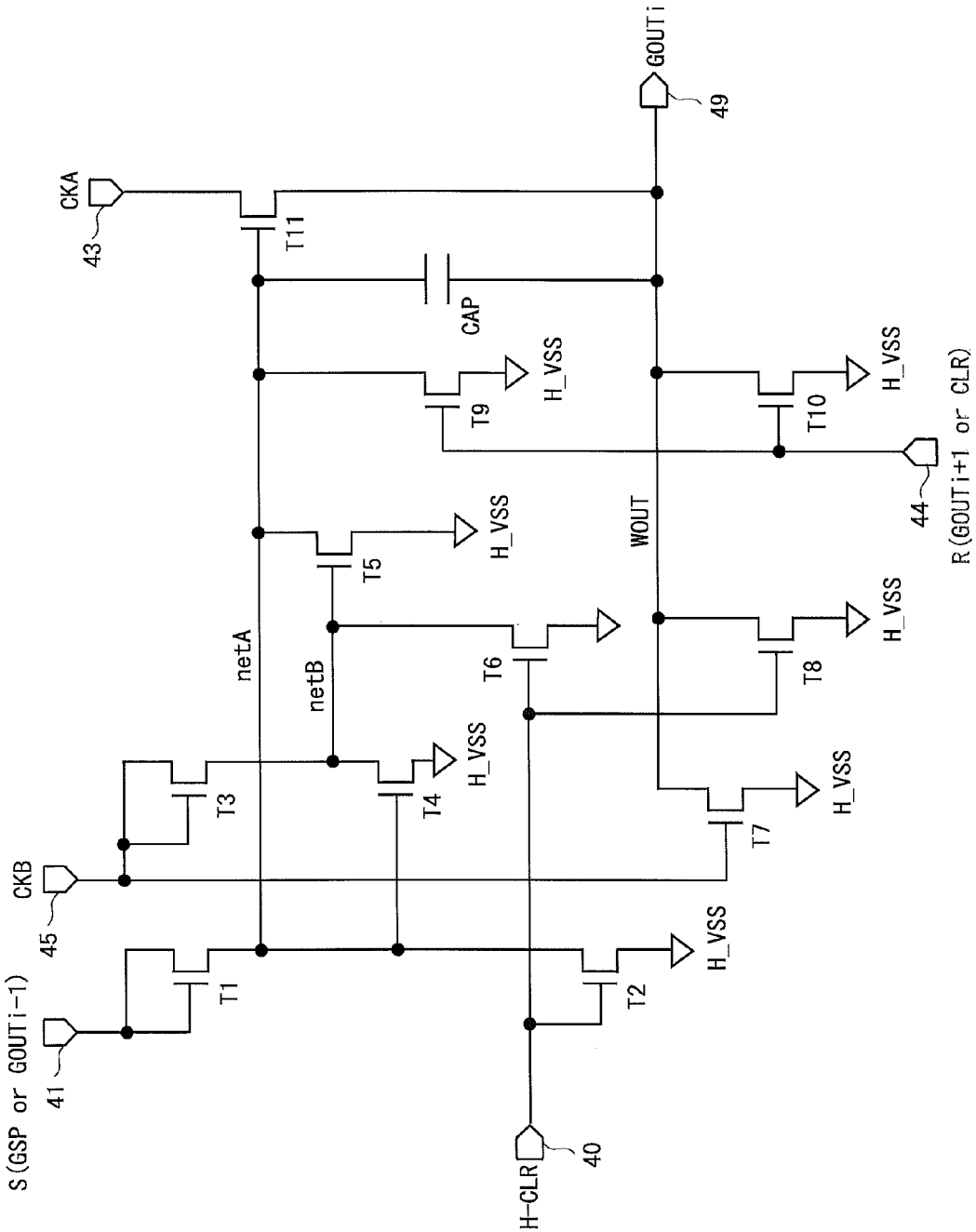
FIG. 6 is a circuit diagram illustrating the configuration of a unit circuit included in the shift register in the first embodiment.

FIG. 6 is a circuit diagram illustrating the configuration of the i'th-stage unit circuit SRi included in the shift register 51 in the present embodiment. As shown in FIG. 6, the unit circuit SRi includes thin-film transistors T1 to T11 and a capacitor CAP. The unit circuit SRi also includes an input terminal 43 at which to receive a first clock CKA, an input terminal 45 at which to receive a second clock CKB, an input terminal 41 at which to receive a set signal S, an input terminal 40 at which to receive a clear signal H_CLR, an input terminal 44 at which to receive a reset signal R, and an output terminal 49 from which to provide an output signal GOUT. Note that the aforementioned thin-film transistors T1 to T11 are n-channel thin-film transistors which are formed on the liquid crystal panel 10 using one of the following oxide semiconductors for their semiconductor layers: amorphous silicon, polysilicon, microcrystalline silicon, or In—Ga—Zn—O.

Next, the connection relationship between the components of the unit circuit SRi will be described. A source terminal of the thin-film transistor T1, a drain terminal of the thin-film transistor T2, a drain terminal of the thin-film transistor T5, a drain terminal of the thin-film transistor T9, a gate terminal of the thin-film transistor T11, and one terminal of the capacitor CAP are connected to one another. Note that the line that connects them will be referred to as the first node netA.

A drain terminal of the thin-film transistor T4, a drain terminal of the thin-film transistor T6, a source terminal of the thin-film transistor T3, and a gate terminal of the thin-film transistor T5 are connected to one another. Note that the line that connects them will be referred to as the second node netB.

A drain terminal of the thin-film transistor T7, a drain terminal of the thin-film transistor T8, a drain terminal of the thin-film transistor T10, a drain terminal of the thin-film transistor T11, the other terminal of the capacitor CAP, and the output terminal 49 are connected to one another. Note that the line that connects them will be referred to as the output line WOUT.

Next, the function of each component of the unit circuit SRi will be described. The thin-film transistor T2 sets the voltage of the first node netA at low level when the clear signal H_CLR is at high level. The thin-film transistor T1 sets the voltage of the first node netA at high level when the set signal S is at high level. The thin-film transistor T11 (output thin-film transistor) outputs the voltage of the first clock CKA to the output terminal 49 when the voltage of the first node netA is at high level. The thin-film transistor T3 sets the voltage of the second node netB at high level when the second clock CKB is at high level.

The thin-film transistor T4 sets the voltage of the second node netB at low level when the voltage of the first node netA is at high level. If the voltage of the second node netB is set at high level while the gate bus line GL connected to the output terminal 49 of the unit circuit SRi is being selected, so that the thin-film transistor T5 is brought into ON state, the voltage of the first node netA decreases, which brings the thin-film transistor T11 into OFF state. The thin-film transistor T4 is provided for the purpose of preventing such a phenomenon.

The thin-film transistor T6 sets the voltage of the second node netB at low level when the clear signal H_CLR is at high level. If the thin-film transistor T6 is not provided, the voltage of the second node netB is always at high level except during the selection period, so that a bias voltage is applied continuously to the thin-film transistor T5. As a result, the threshold voltage of the thin-film transistor T5 rises, which causes the thin-film transistor T5 not to function appropriately as a switch. The thin-film transistor T6 is provided for the purpose of preventing such a phenomenon.

The thin-film transistor T5 (discharge transistor) sets the voltage of the first node netA at low level when the voltage of the second node netB is at high level. The thin-film transistor T9 sets the voltage of the first node netA at low level when the reset signal R is at high level. The thin-film transistor T10 sets the voltage of the output line WOUT at low level when the reset signal R is at high level. The thin-film transistor T7 sets the voltage of the output line WOUT at low level when the second clock CKB is at high level. When the voltage of the output line WOUT is at low level, the output signal GOUTi provided by the output terminal 49 is at low level. The capacitor CAP functions as a compensation capacitor for maintaining the voltage of the first node netA at high level while the gate bus line GLi connected to the output terminal 49 of the unit circuit SRi is being selected.

Note that the set signal S is the output signal GOUT(i−1) from the previous stage, i.e., the (i−1)'th-stage unit circuit SR(i−1), and it is also the gate start pulse signal H_GSP for the first-stage unit circuit SR1. Moreover, the reset signal R is the output signal GOUT(i+1) from the next stage, i.e., the (i+1)'th-stage unit circuit SR(i+1), and it is also the clear signal H_CLR for the n'th-stage unit circuit SRn.

Figure 7:
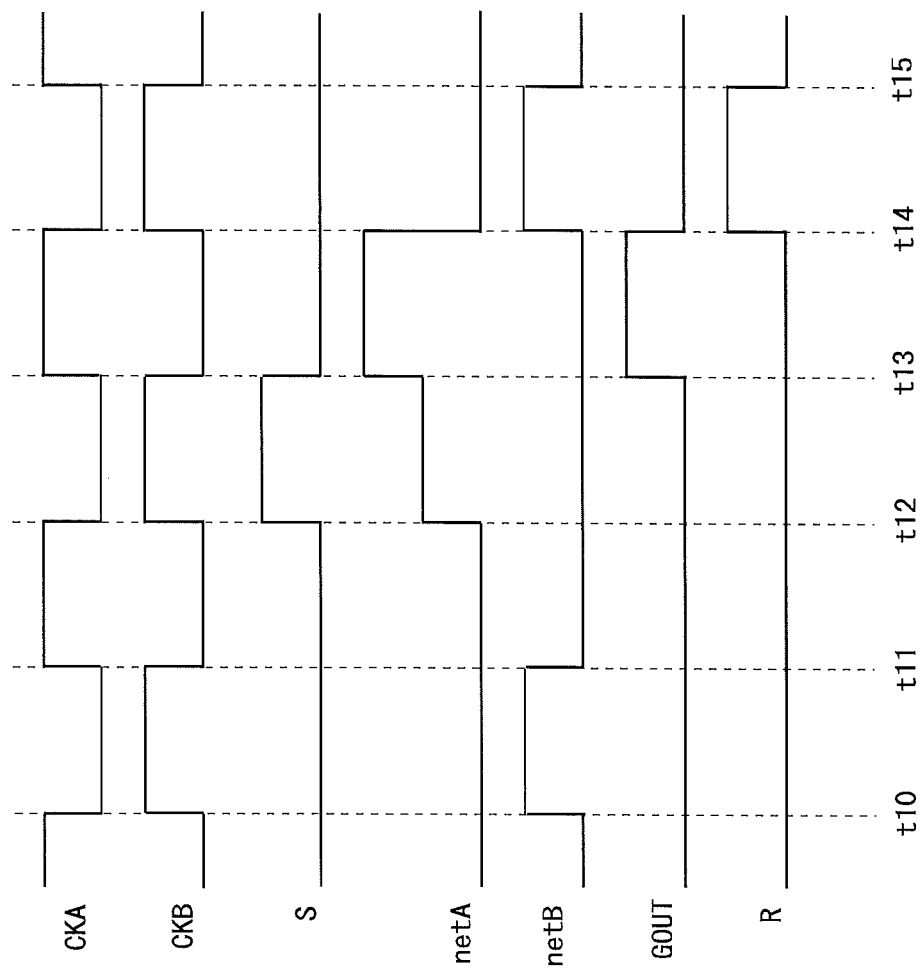
FIG. 7 provides signal waveform charts describing the operation of the shift register in the first embodiment.

Next, the operation of the i'th unit circuit SRi will be described. FIG. 7 provides signal waveform charts describing the operation of the shift register 51. As shown in FIG. 7, at time t12, the output signal GOUT(i−1) from the (i−1)'th-stage unit circuit SR(i−1) is provided to the unit circuit SRi as a pulse of the set signal S, along with the first and second clocks CKA and CKB. The thin-film transistor T1 is diode-connected, and therefore, the first node netA is precharged by the pulse of the set signal S. During this period, the thin-film transistor T4 is brought into ON state, and therefore, the voltage of the second node netB is kept at low level. Moreover, during this period, the output signal GOUTi+1 from the (i+1)'th-stage unit circuit SR(i+1), which serves as the reset signal R, is at low level. Accordingly, the thin-film transistor T9 and the thin-film transistor T10 are brought into OFF state, so that the voltage of the first node netA, which has risen because of precharge, does not decrease during this period.

At time t13, the first clock CKA changes from low level to high level. Here, the first clock CKA, which is at high-level, is applied to the source terminal of the thin-film transistor T11, and there is parasitic capacitance (not shown) between the gate and the source of the thin-film transistor T11. Accordingly, as the source voltage of the thin-film transistor T11 rises, the voltage of the first node netA also rises by virtue of the bootstrap effect. As a result, the thin-film transistor T11 is brought into ON state. The first clock CKA maintains high level, and therefore, the output signal GOUTi is set at high level. Accordingly, the high-level output signal GOUTi is outputted as a scanning signal G(i), so that the gate bus line GLi is selected. Consequently, the image signal is written to the liquid crystal capacitance Clc in the pixel forming portion 90 connected to the gate bus line GLi. Note that during this period, the thin-film transistor T9 and the thin-film transistor T10 are still in OFF state, and therefore, the voltage of the first node netA does not fall.

At time t14, the first clock CKA changes from high level to low level. Moreover, the second clock CKB changes from low level to high level. Furthermore, the reset signal R changes from low level to high level. As a result, the thin-film transistors T9 and T10 are brought into ON state. As a result of the thin-film transistor T9 being brought into ON state, the voltage of the first node netA is set to the reference voltage VSS, so that the thin-film transistor T11 is brought into OFF state. Moreover, as a result of the thin-film transistor T10 being brought into ON state, the voltage of the output line WOUT is set to the reference voltage VSS, so that the output signal GOUTi from the output terminal 49 falls to the reference voltage VSS. Note that in FIG. 6 and its descriptions, the reference voltage H_VSS is abbreviated as the reference voltage VSS.

As a result of the above operation being repeated, there is a significant increase in voltage due to the bootstrap effect in the shift register 51, sequentially from the first node netA1 of the first-stage unit circuit SR1 to the first node netAn of the n'th-stage unit circuit SRn, so that the output signals GOUT(1) to GOUT(n) from the first-through n'th-stage unit circuits SR1 to SRn are sequentially set at high level for a predetermined period of time.

In this manner, the unit circuits SR1 to SRn provide the output signals GOUT, each being set at high level for one horizontal scanning period, so that the output signals GOUT1 to GOUTn are supplied to their corresponding gate bus lines GL1 to GLn as scanning signals G(1) to G(n).

As described above, by inputting the high-level clear signal H_CLR to the input terminal 40, the voltage of the first node netA, the voltage of the second node netB, and even the voltage of the output line WOUT are set to the reference voltage VSS. However, the present invention is an invention for preventing deterioration of the thin-film transistor due to a shift of the threshold voltage. Therefore, in the following embodiments, any descriptions of the voltage of the output line WOUT being set to the reference voltage VSS will be omitted, and only the descriptions of the voltage of the first node netA and the voltage of the second node netB being set to the reference voltage VSS will be described.

<1.5 Effects>

In the present embodiment, the gate driver 50 scans the n'th gate bus line GLn, and applies the high-level clear signal H_CLR to the thin-film transistors T2, T6, and T8 in all of the unit circuits SR1 to SRn immediately before the end of the drive period. As a result, the thin-film transistors T2, T6, and T8 are brought into ON state, and the voltage of the first node netA, the voltage of the second node netB, and the voltage of the output line WOUT in each of the unit circuits SR1 to SRn are set to the reference voltage VSS. Consequently, the reference voltage VSS is applied to the gate terminal of the thin-film transistor T11 connected to the first node netA and also to the gate terminal of the thin-film transistor T5 connected to the second node netB, and therefore, even if the pause period lasts for a long period of time, the gate terminals of the thin-film transistors T5 and T11 are not subjected to sustained voltage application. Thus, deterioration of the thin-film transistors T5 and T11 can be prevented from progressing.

Furthermore, during the pause period also, the level shifter 70 provides the gate driver 50 with control signals, including the first and second gate clock signals H_GCK1 and H_GCK2, which are at low level, and therefore, the output signals GOUT1 to GOUTn from the unit circuits SR1 to SRn are also at low level. Accordingly, the first and second nodes netA and netB hold the reference voltage VSS, which is the voltage immediately before the transition to the pause period. In this manner, even if the pause period lasts for a long period of time, the gate terminals of the thin-film transistors T5 and T11 are not subjected to sustained voltage application, and therefore, deterioration of the thin-film transistors T5 and T11 can be prevented from progressing during the pause period.

Furthermore, the thin-film transistor whose semiconductor layer is made from an oxide semiconductor such as In—Ga—Zn—O offers a less off-leakage current compared to the thin-film transistor whose semiconductor layer is made from amorphous silicon. Accordingly, if the drive period ends and transitions to the pause period, with charges stored in the first node netA and the second node netB within the unit circuit SR, voltage application to the gate terminals continues because of the charges remaining in the first node netA and the second node netB, causing deterioration of the thin-film transistors T5 and T11 to progress. Accordingly, to remove the charges remaining in the first node netA and the second node netB at the end of the drive period, the thin-film transistors T2 and T6 respectively connected to the first node netA and the second node netB are provided with high-level voltages before the transition to the pause period, so that the charges remaining in the first node netA and the second node netB can be removed. Thus, it is possible to reliably set the voltages of the first node netA and the second node netB to the reference voltage VSS, thereby preventing deterioration of the thin-film transistors T5 and T11 from progressing during the pause period. In addition, the gate driver 50 is configured using the thin-film transistors whose semiconductor layers are made from an oxide semiconductor such as In—Ga—Zn—O, which makes it possible to realize a reduced frame area and high-definition quality.

<2. Second Embodiment>

A second embodiment of the present invention will be described. The overall configuration of the liquid crystal display device, the configuration of the gate driver 50, and the configuration of the unit circuits SR1 to SRn included in the gate driver 50 are the same as in the first embodiment, and therefore, any figures and descriptions thereof will be omitted.

<2.1 Operation of the Gate Driver>

Figure 8:
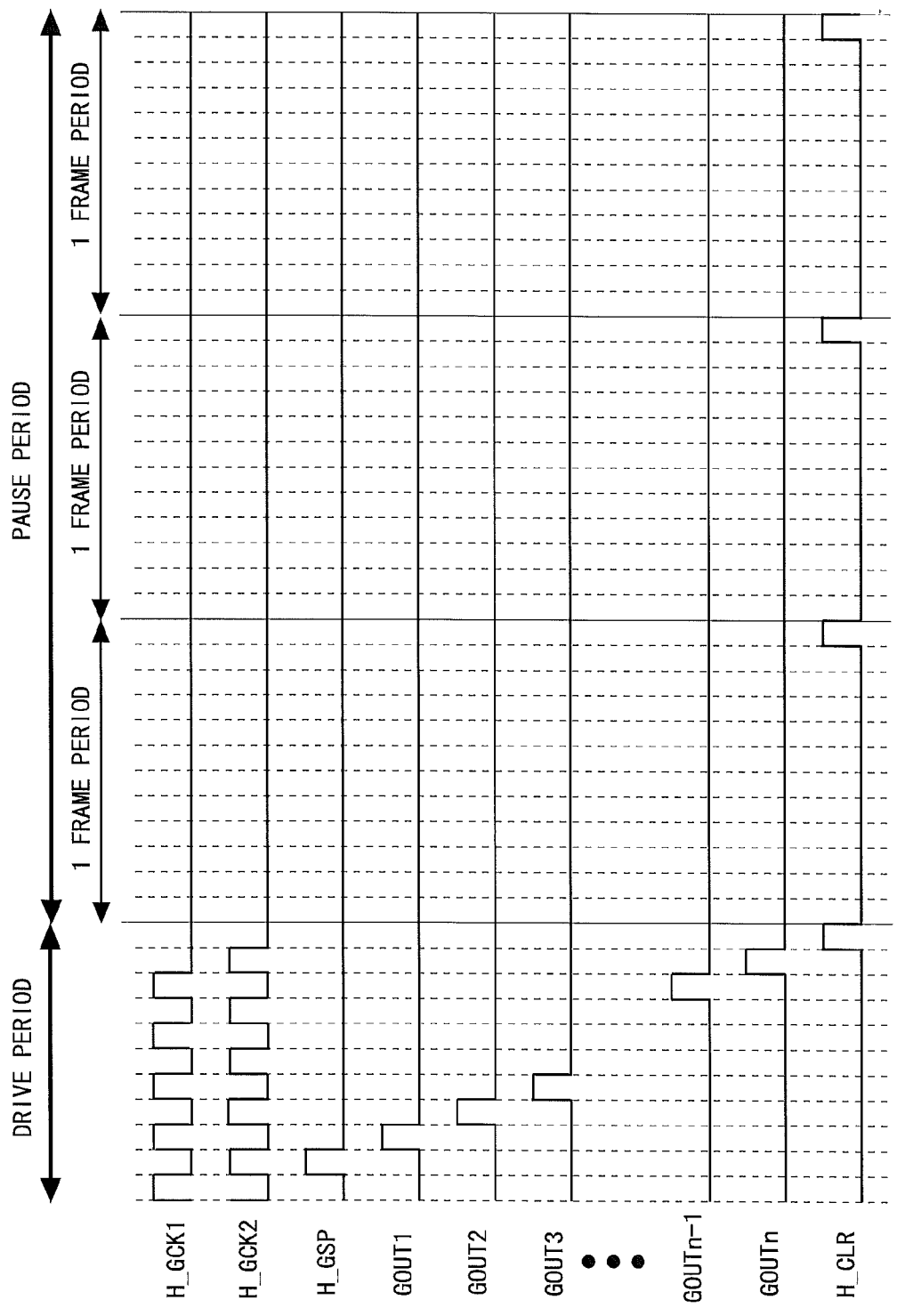
FIG. 8 provides signal waveform charts describing the operation of a gate driver in a second embodiment of the present invention.

FIG. 8 provides signal waveform charts describing the operation of the gate driver 50 in the present embodiment. As shown in FIG. 8, the liquid crystal display device displays an image on the display portion 35 while alternating between a drive period and a pause period. The operation of the gate driver 50 during the drive period is the same as in the first embodiment, and therefore, any description thereof will be omitted. However, the duration of the pause period is longer than in the first embodiment. For example, in the first embodiment, the duration of the pause period is one frame period, which is the same as the duration of the drive period. However, in the present embodiment, the duration of the pause period is, for example, three frame periods.

In the case where the pause period is longer, as described above, the following problem might arise. In the first embodiment, a high-level clear signal H_CLR is applied to each input terminal 40 of all unit circuits SR1 to SRn immediately before the end of the drive period, thereby causing the voltages of both the first node netA and the second node netB to be set to the reference voltage VSS during the pause period. However, the first and second nodes netA and netB are in a floating state during the pause period, and therefore, some noise might be introduced into some of the unit circuits SR during the pause period, so that the first or second node netA or netB is subjected to voltage application. If any voltage caused by noise is applied to either the first or second node netA or netB, the applied voltage continues to be applied to the gate terminal of the thin-film transistor T5 or T11 until the end of the pause period because the nodes are in a floating state. The thin-film transistor T5 or T11, whose gate terminal continues to be subjected to sustained voltage application as mentioned above, experiences a shift of the threshold voltage, which causes deterioration of the thin-film transistor T5 or T11 to progress.

Accordingly, in the case where the pause period is longer than one frame period, the high-level clear signal H_CLR is applied immediately before the end of the drive period, and is also applied even after the transition to the pause period, for example, every frame period. In FIG. 8, where the drive alternates between a one-frame drive period and the following three-frame pause period, the high-level clear signal H_CLR is repeatedly applied to each input terminal 40 of all of the unit circuits SR1 to SRn every frame period until the end of the pause period. As a result, the voltages of the first and second nodes netA and netB in all of the unit circuits SR1 to SRn are set to the reference voltage VSS, and the voltage of the output line WOUT is also set to the reference voltage VSS, so that the output signals GOUT from the output terminals 49 are set to the reference voltage VSS as well.

Note that the pause period has been described above as having a duration of three frame periods. However, the duration of the pause period is not limited to this, and may be shorter or longer than three frame periods. Moreover, the high-level clear signal H_CLR has been described as being applied every frame period during the pause period, and the application timing has been described as being immediately before the end of the frame period. However, the timing of applying the clear signal H_CLR is not limited to this, and the clear signal H_CLR may be applied, for example, every two frame periods immediately before the end of the two frame periods.

<2.2 Effects>

In the present embodiment, the high-level clear signal H_CLR is applied to the input terminals 40 of all of the unit circuits SR1 to SRn immediately before the end of every frame period not only during the drive period but also during the pause period. As a result, even if some noise occurs during the pause period so that the first node netA or the second node netB in at least one of the unit circuits SR is subjected to voltage application, the voltages of the first nodes netA and the second nodes netB in the unit circuits SR1 to SRn are set to the reference voltage VSS upon each occurrence of such noise, and therefore, the gate terminals of the thin-film transistors T5 and T11 are not subjected to sustained voltage application. Accordingly, even if the pause period lasts for a long period of time, the threshold voltages of the thin-film transistors T5 and T11 do not shift, whereby deterioration of the thin-film transistors T5 and T11 can be prevented from progressing.

<3. Third Embodiment>

Figure 9:
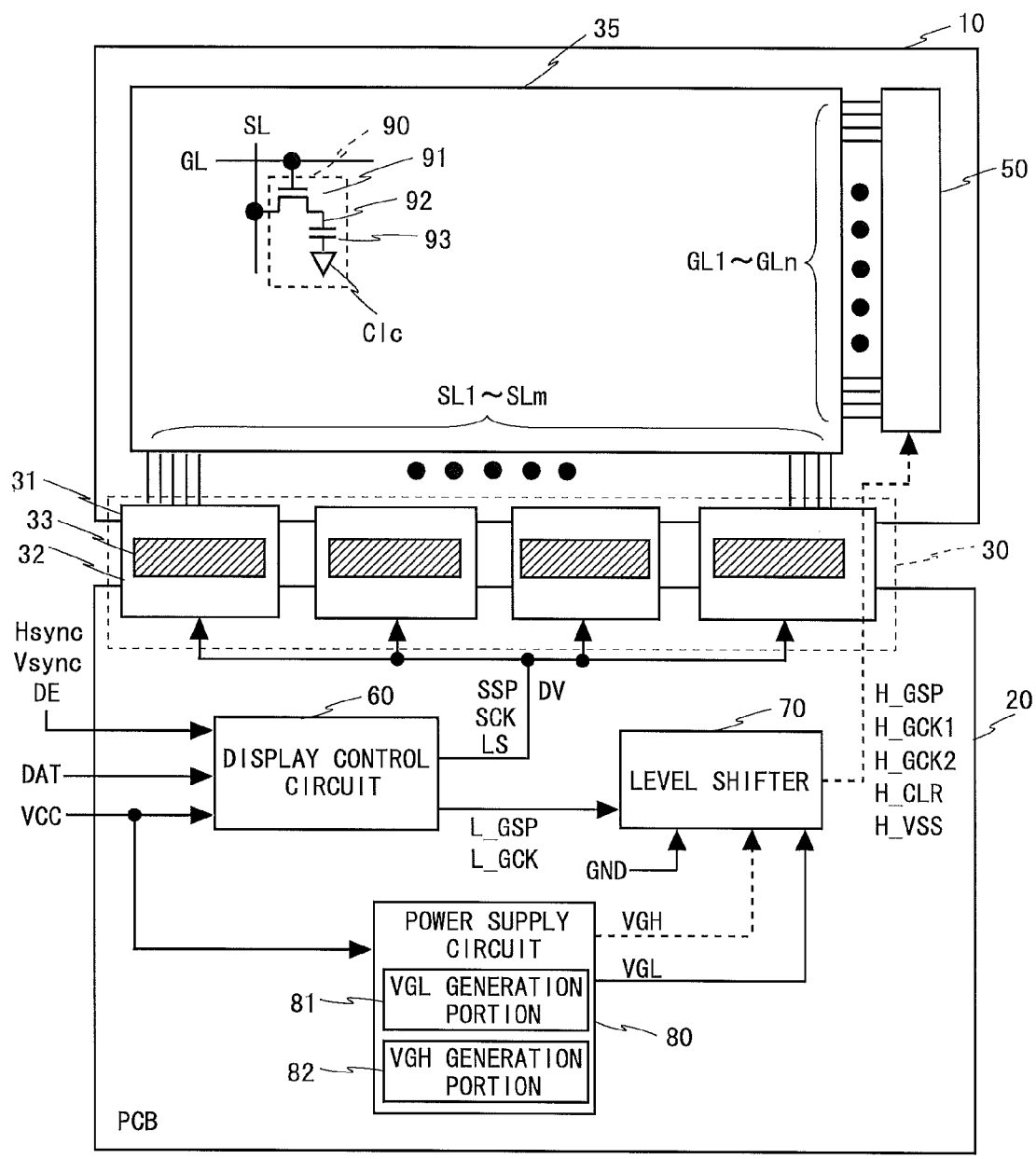
FIG. 9 is a block diagram illustrating the configuration of a liquid crystal display device in a third embodiment of the present invention during a pause period.

A third embodiment of the present invention will be described. FIG. 9 is a block diagram illustrating the configuration of a liquid crystal display device according to the present embodiment during the pause period. Note that the block diagram that illustrates the configuration of the liquid crystal display device according to the present embodiment during the drive period is the same as the block diagram shown in FIG. 1, and therefore, the diagram and descriptions thereof will be omitted.

The operation of the liquid crystal display device during the pause period will be described with reference to FIG. 9. The components shown in FIG. 9 that are the same as those shown in FIG. 1 are denoted by the same reference characters, and any descriptions thereof will be omitted. The power supply circuit 80 includes the VGL generation portion 81 for generating the low-level voltage VGL and the VGH generation portion 82 for generating the high-level voltage VGH. Accordingly, in the present embodiment, the operation of the VGH generation portion 82 is stopped during the pause period, so that only the VGL generation portion 81 is operated.

The reason why the operation of the VGH generation portion 82 in the power supply circuit 80 is stopped during the pause period as described above will be described. As the power supply circuit 80, which generates a high voltage from a low voltage, a switching regulator, a charge pump, or the like, which uses a high-frequency switching signal, is often used. In the case where the power supply circuit 80 is operated even during the pause period, the high-frequency signal might be introduced into each of the unit circuits SR1 to SRn as noise through the line that connects the power supply circuit 80 and the gate driver 50 during the pause period, so that the voltage of the first node netA or the second node netB, which is in a floating state, is set to high level.

Accordingly, when the drive period transitions to the pause period, the operation of the VGH generation portion 82 in the power supply circuit 80 is stopped, and only the VGL generation portion 81 is operated. As a result, the power supply circuit 80 outputs only the voltage VGL to the level shifter 70 during the pause period. In this case, the operation of the level shifter 70 is stopped, so that the voltage of the line that connects the level shifter 70 and the gate driver 50 is fixed at the level of the voltage VGL, which is low level. Thus, any noise generated in the power supply circuit 80 during the pause period is not introduced into the unit circuits SR1 to SRn through the line, so that no voltage caused by such noise is applied to the first nodes netA and the second nodes netB in the unit circuits SR1 to SRn.

Furthermore, in the case where the pause period is long, the VGH generation portion 82 of the power supply circuit 80 is operated, for example, every frame period during the pause period, as in the second embodiment, so that the high-level voltage VGH, along with the low-level voltage VGL, is provided to the level shifter 70. As a result, the level shifter 70 generates and provides a high-level clear signal H CLR to the unit circuits SR1 to SRn, so that the voltages of the first nodes netA and the second nodes netB in the unit circuits SR1 to SRn are set to the reference voltage VSS. The signal waveform charts that describe the operation of the gate driver 50 in this case are omitted because they are the same as the signal waveform charts shown in FIG. 8.

Note that the signal waveform charts that illustrate the operation of the liquid crystal display device, as well as the configuration and the operation of the gate driver 50 are the same as in the first embodiment, and therefore, any diagrams and descriptions thereof will be omitted.

<3.1 Effects>

In the present embodiment, since both the VGL generation portion 81 and the VGH generation portion 82 in the power supply circuit 80 are operated during the drive period, the level shifter 70 provides the high-level clear signal H_CLR simultaneously to the unit circuits SR1 to SRn at the end of the drive period, thereby setting the voltages of the first nodes netA and the second nodes netB to the reference voltage VSS. Thus, even if the pause period lasts for a long period of time, the gate terminals of the thin-film transistors T5 and T11 are not subjected to sustained voltage application, whereby deterioration of the thin-film transistors T5 and T11 can be prevented from progressing.

Furthermore, the operation of the VGH generation portion 82 is stopped during the pause period, but the VGL generation portion 81 operates and outputs the low-level voltage VGL. Accordingly, there is no switching noise generated by the operation of the VGH generation portion 82, so that voltages caused by switching noise become less likely to be applied to the first and second nodes netA and netB, whereby deterioration of the thin-film transistors T5 and T11 can be more reliably prevented from progressing.

The operation of the level shifter 70 is stopped, so that the low-level voltage VGL outputted by the VGL generation portion 81 is applied to the line that connects the level shifter 70 and the gate driver 50, and the voltage of the line is fixed at the voltage VGL. As a result, little noise is introduced into the unit circuits SR1 to SRn through the line, and voltages caused by noise become less likely to be applied to the first and second nodes netA and netB.

Furthermore, since the operation of the VGH generation portion 82 in the power supply circuit 80 is stopped during the pause period, power consumption in the liquid crystal display device during the pause period can be reduced.

<4. Fourth Embodiment>

Figure 10:
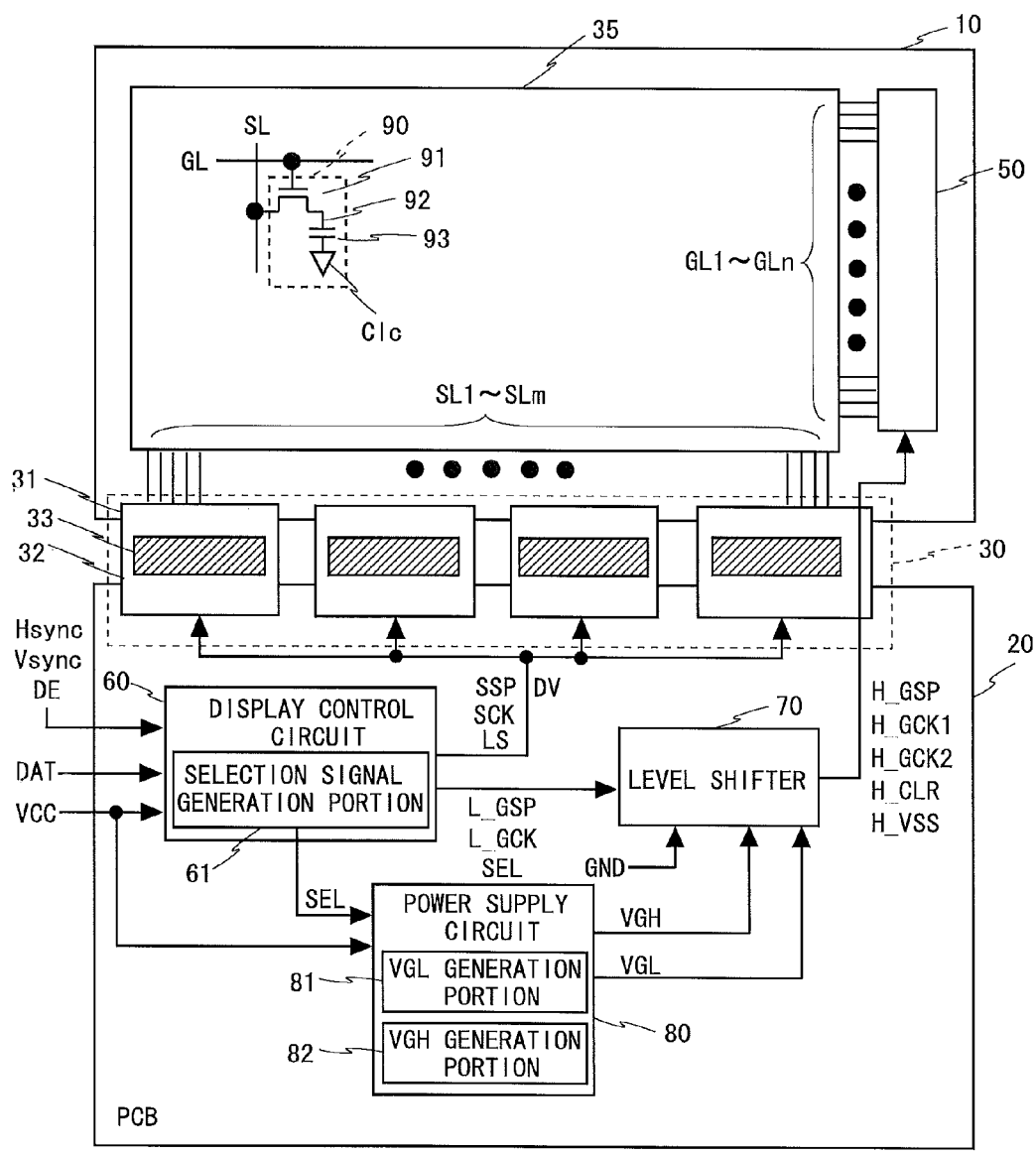
FIG. 10 is a block diagram illustrating the configuration of a liquid crystal display device in a fourth embodiment of the present invention during the pause period.

A fourth embodiment of the present invention will be described. FIG. 10 is a block diagram illustrating the configuration of a liquid crystal display device according to the present embodiment during the pause period. The liquid crystal display device according to the present embodiment is the same as the liquid crystal display device shown in FIG. 1, except that the display control circuit 60 has a selection signal generation portion 61 provided therein. Accordingly, the components shown in FIG. 10 that are the same as those shown in FIG. 1 are denoted by the same reference characters, and any descriptions thereof will be omitted.

As shown in FIG. 10, the selection signal generation portion 61 provided in the display control circuit 60 generates and outputs a selection signal SEL to the power supply circuit 80 and the level shifter 70. The VGH generation portion 82 of the power supply circuit 80 operates when the selection signal SEL is at high level and stops operating when the signal falls to low level. When the selection signal SEL is at high level, the level shifter 70 performs level shifting on control signals, such as the first gate clock signal H_GCK1 and the second gate clock signal H_GCK2, in accordance with the voltages VGH and VGL, whereas when the selection signal SEL is at low level, the level shifter 70 stops operating.

Accordingly, the selection signal generation portion 61 outputs a high-level selection signal SEL during the drive period. Then, after the transition to the pause period, the high-level selection signal SEL is outputted immediately before the end of every frame period, and a low-level signal is outputted for the rest of the frame period. As a result, during the pause period, a high-level clear signal H_CLR is provided to all unit circuits SR1 to SRn immediately before the end of every frame period. As a result, the voltages of the first and second nodes netA and netB in each unit circuit are set to the reference voltage VSS every frame period.

Figure 11:
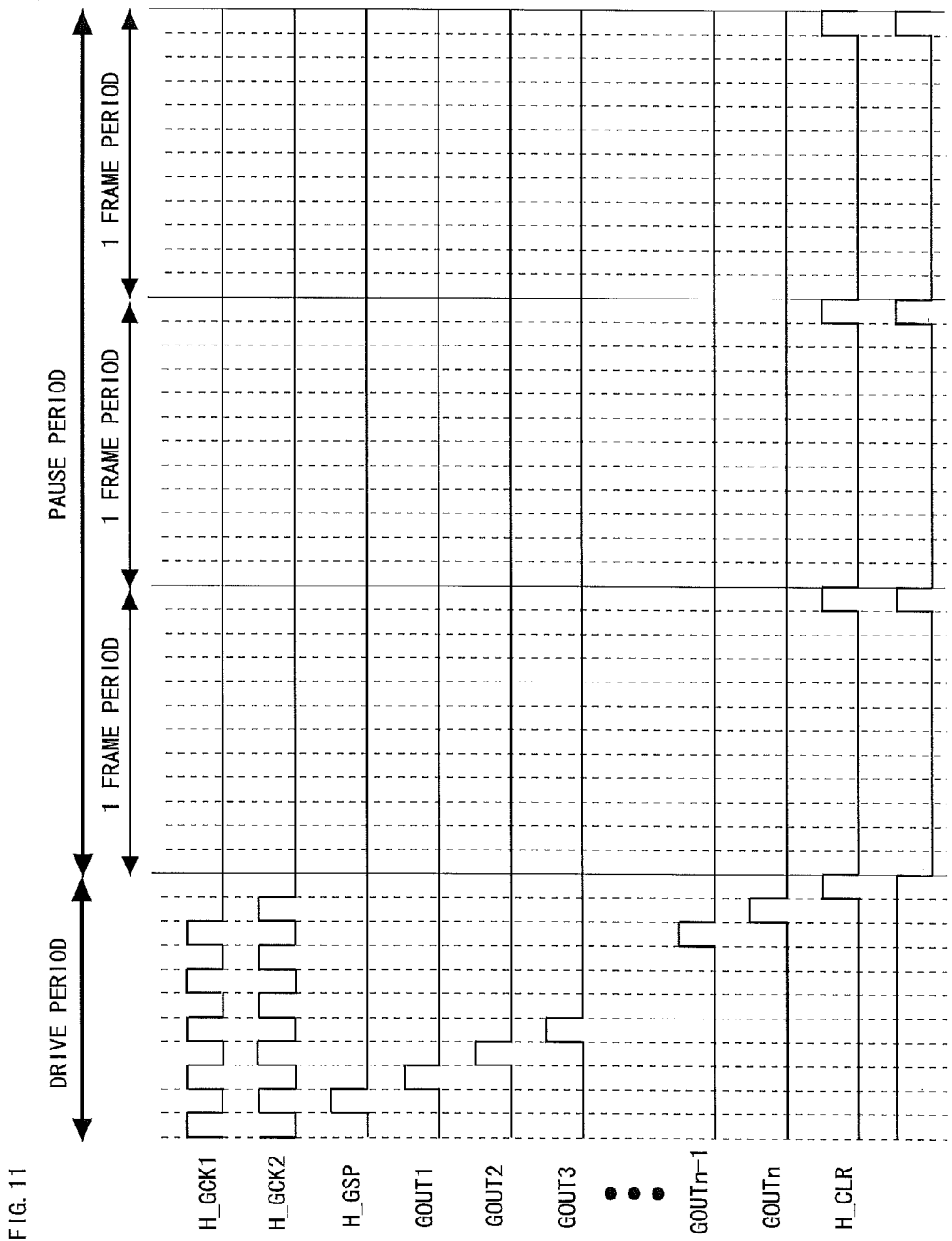
FIG. 11 provides signal waveform charts illustrating the operation of a gate driver in the fourth embodiment.
Figure 12:
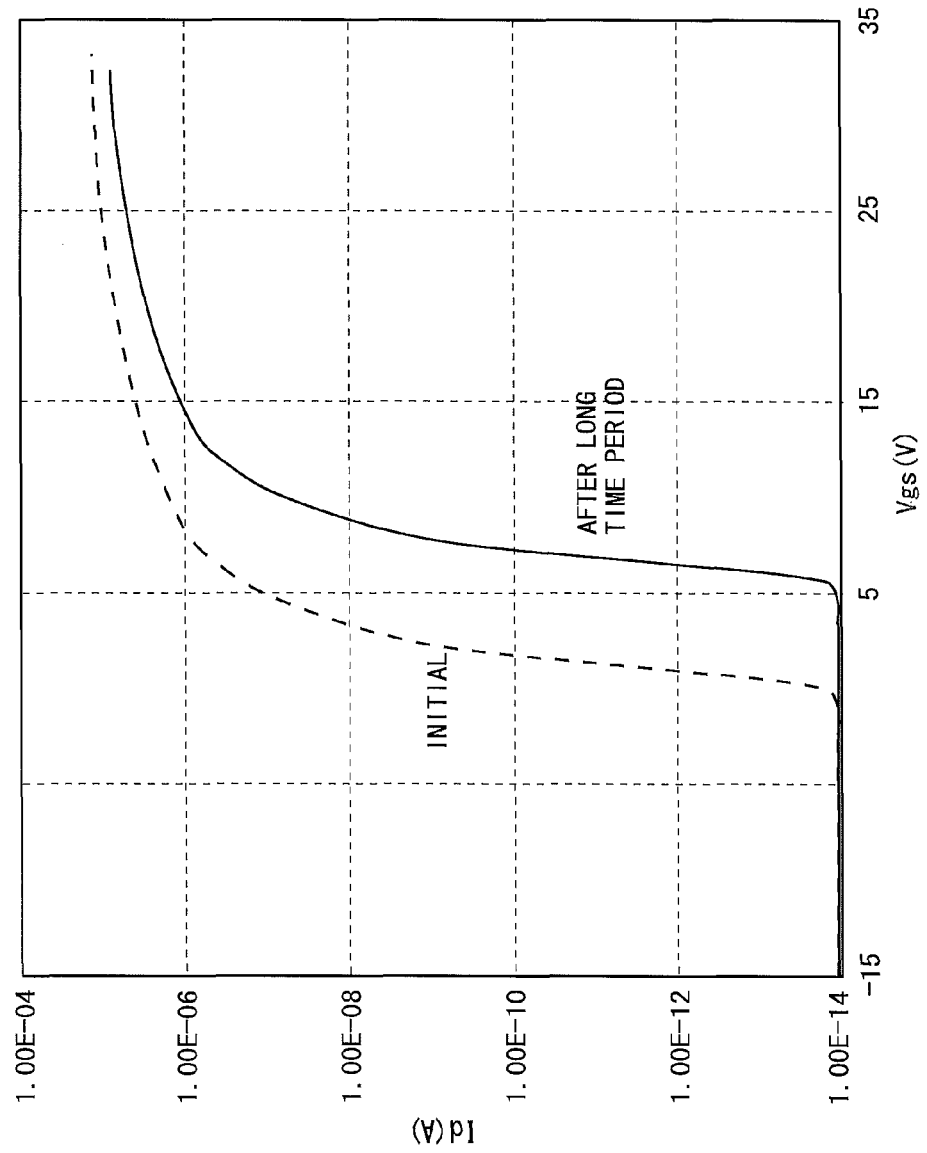
FIG. 12 is a graph showing the characteristics of a thin-film transistor of a conventional gate-in-panel liquid crystal display device where pause drive is performed.

FIG. 11 provides signal waveform charts illustrating the operation of the gate driver 50 in the present embodiment. As shown in FIG. 11, the signal waveforms during the drive period are the same as in the first embodiment, except that the clear signal H_CLR is always at high level, and therefore, any description thereof will be omitted.

Next, after the transition to the pause period, the selection signal SEL is set to high level immediately before the end of each frame period. When the selection signal SEL is set to high level, the VGH generation portion 82 of the power supply circuit 80 provides the level shifter 70 with a voltage VGH, which is also at high level, and therefore, the level shifter 70 outputs a high-level clear signal H_CLR. The high-level clear signal H_CLR is provided to all unit circuits SR1 to SRn in the gate driver 50.

Note that in the case where the pause period is short, the level shifter 70 does not output the high-level clear signal H_CLR during the pause period, as in the first embodiment. Accordingly, the voltages of the first node netA and the second node netB in each of the unit circuits SR1 to SRn are the same as the reference voltage VSS applied at the end of the drive period. The signal waveform charts that describe the operation of the gate driver 50 in this case are omitted because they are the same as the signal waveform charts shown in FIG. 5.

Note that the configuration and the operation of the gate driver 50 are the same as in the first embodiment, and therefore, any descriptions thereof will be omitted.

<4.1 Effects>

In the present embodiment, since the high-level selection signal SEL is provided to the power supply circuit 80 and the level shifter 70 during the drive period, the power supply circuit 80 provides the high-level voltage VGH and the low-level voltage VGL to the level shifter 70. As a result, the level shifter 70 provides the high-level clear signal H_CLR simultaneously to the unit circuits SR1 to SRn at the end of the drive period, thereby setting the voltages of the first nodes netA and the second nodes netB to the reference voltage VSS. Thus, even if the pause period lasts for a long period of time, the gate terminals of the thin-film transistors T5 and T11 are not subjected to sustained voltage application, whereby deterioration of the thin-film transistors T5 and T11 can be prevented from progressing.

Furthermore, since the selection signal SEL is at low level during the pause period, the VGH generation portion 82 stops operating, so that only the VGL generation portion operates and outputs the low-level voltage VGL. Accordingly, there is no switching noise generated by the operation of the VGH generation portion 82, so that voltages caused by switching noise become less likely to be applied to the first node netA and the second node netB, whereby deterioration of the thin-film transistors T5 and T11 can be more reliably prevented from progressing.

The level shifter 70 stops operating, and the low-level voltage VGL outputted by the VGL generation portion 81 is applied to the line that connects the level shifter 70 and the gate driver 50, so that the voltage of the line is fixed at low level. Thus, little noise is introduced into the unit circuits SR1 to SRn through the line, so that voltages caused by noise become less likely to be applied to the first node netA and the second node netB.

Furthermore, since the VGH generation portion 82 of the power supply circuit 80 stops operating during the pause period, power consumption in the liquid crystal display device during the pause period can be reduced.

INDUSTRIAL APPLICABILITY

The present invention is applied to gate-in-panel display devices capable of preventing deterioration of thin-film transistors during pause drive.

DESCRIPTION OF THE REFERENCE CHARACTERS 10 liquid crystal panel
20 printed circuit board
30 source driver (data signal line driver circuit)
31 TCP 40 display portion
50 gate driver (scanning signal line driver circuit)
60 display control circuit
61 selection signal generation portion
70 level shifter
80 power supply circuit
81 VGL generation portion (second voltage generation portion)
82 VGH generation portion (first voltage generation portion)
90 pixel forming portion
GL gate bus line (scanning signal line)
H_CLR clear signal
SL source bus line (data signal line)
SR unit circuit
T5 thin-film transistor (discharge thin-film transistor)
T11 thin-film transistor (output thin-film transistor)

The invention claimed is:

1. A display device performing pause drive which alternates between a drive period and a pause period in predetermined cycles, comprising:
   a plurality of scanning signal lines and a plurality of data signal lines crossing the scanning signal lines;
   a plurality of pixel forming portions arranged in a matrix corresponding to respective crossings of the scanning signal lines and the data signal lines;
   a scanning signal line driver circuit including a shift register to sequentially output active scanning signals to the scanning signal lines by sequentially setting a plurality of cascaded unit circuits having a first state and a second state to the first state;
   a data signal line driver circuit to apply image signals to the data signal lines and thereby writing the image signals to the pixel forming portions that are connected to scanning signal lines being selected;
   a power supply circuit including a first voltage generation portion to generate a high-level voltage and a second voltage generation portion to generate a low-level voltage;
   a display control circuit, in accordance with a first control signal and image data, to generate a second control signal and a third control signal, the first control signal and the image data being externally transmitted, the second control signal controlling the operation of the scanning signal line driver circuit, the third control signal controlling the operation of the data signal line driver circuit; and
   a level shifter to output the second control signal provided by the display control circuit to the scanning signal line driver circuit after adjusting the level of the second control signal in accordance with the high-level voltage provided by the first voltage generation portion and the low-level voltage provided by the second voltage generation portion, wherein,
   each of the unit circuits includes a plurality of nodes and a plurality of thin-film, transistors connected to the nodes at gate terminals, the nodes set in a floating state during the pause period,
   the level shifter outputs the active scanning signals, such that the scanning signal line driver circuit applies the active scanning signals sequentially to the scanning signal lines, during the drive period, and then provides an active clear signal generated on the basis of the high-level voltage and the low-level voltage, simultaneously to the unit circuits, thereby setting voltages of the nodes to a reference voltage before a transition to the pause period,
   the level shifter provides the second control signal to the scanning signal line driver circuit during the pause period, the second control signal being a low-level signal generated on the basis of the high-level and the low-level voltages respectively provided by the first and the second voltage generation portions, and
   the level shifter generates the active clear signal in predetermined cycles during the pause period, and provides the active clear signal simultaneously to the unit circuits, thereby setting the voltages of the nodes to the reference voltage.

2. The display device according to claim 1, wherein,
   the nodes include first nodes and second nodes,
   the thin-film transistors include output thin-film transistors to output the active scanning signals and discharge thin-film transistors to set voltages of the first nodes to the reference voltage, the output thin-film transistors being connected to the first nodes at the gate terminals, the discharge thin-film transistors being connected to the second nodes at the gate terminals, and
   the active clear signal causes the voltages of the first and the second nodes included in the unit circuits to be simultaneously set to the reference voltage.

3. The display device according to claim 2, wherein,
   the unit circuits are sequentially set into the first state in accordance with first clocks and second clocks,
   the output thin-film transistors output the first clocks as the active scanning signals,
   the discharge thin-film transistors are set in an ON state when the second clocks become active, thereby setting the voltages of the first nodes to the reference voltage, and
   the level shifter outputs the first clocks and the second clocks during the drive period, such that the scanning signal line driver circuit applies the active scanning signals sequentially to the scanning signal lines.

4. A display device performing pause drive which alternates between a drive period and a pause period in predetermined cycles, comprising:
   a plurality of scanning signal lines a plurality of data signal lines crossing the scanning signal lines;
   a plurality of pixel forming portions arranged in a matrix corresponding to respective crossings of the scanning signal lines and the data signal lines;
   a scanning signal line driver circuit including a shift register to sequentially output active scanning signals to the scanning signal lines by sequentially setting a plurality of cascaded unit circuits having a first state and a second state into the first state;
   a data signal line driver circuit to apply image signals to the data signal lines and thereby writing the image signals to the pixel forming portions that are connected to scanning signal lines being selected;
   a power supply circuit including a first voltage generation portion to generate a high-level voltage and a second voltage generation portion to generate a low-level voltage;
   a display control circuit, in accordance with a first control signal and image data, to generate a second control signal and a third control signal, the first control signal and the image data being externally transmitted, the second control signal controlling the operation of the scanning signal line driver circuit, the third control signal controlling the operation of the data signal line driver circuit; and
   a level shifter to output the second control signal provided by the display control circuit to the scanning signal line driver circuit after adjusting the level of the second control signal in accordance with the high-level voltage provided by the first voltage generation portion and the low-level voltage provided by the second voltage generation portion, wherein, each of the unit circuits includes a plurality of nodes and a plurality of thin-film transistors connected to the nodes at gate terminals, the nodes set to a floating state during the pause period, the level shifter outputs the active scanning signals, such that the scanning signal line driver circuit applies the active scanning signals sequentially to the scanning signal lines, during the drive period, and then provides an active clear signal generated on the basis of the high-level voltage and the low-level voltage, simultaneously to the unit circuits, thereby setting voltages of the nodes to a reference voltage before a transition to the pause period, the power supply circuit causes the first and the second voltage generation portions to operate and output the high-level and the low-level voltages to the level shifter during the drive period, and also stops the operation of the first voltage generation portion during the pause period while causing the second voltage generation portion to operate and output the low-level voltage to the level shifter, and the level shifter stops operating during the pause period, thereby fixing a voltage of a line connecting the level shifter and the scanning signal line driver circuit at low level.

5. The display device according to claim 4, wherein, the power supply circuit causes the first voltage generation portion to operate in predetermined cycles during the pause period, thereby providing the high-level voltage to the level shifter, and the level shifter sets the voltages of the nodes to the reference voltage during the pause period by providing the active clear signal simultaneously to the unit circuits, the active clear signal being a signal generated on the basis of the high-level and the low-level voltages respectively provided by the first and the second voltage generation portions.

6. A display device performing pause drive which alternates between a drive period and a pause period in predetermined cycles, comprising:

a plurality of scanning signal lines and a plurality of data signal lines crossing the scanning signal lines;

a plurality of pixel forming portions arranged in a matrix corresponding to respective crossings of the scanning signal lines and the data signal lines;

a scanning signal line driver circuit including a shift register to sequentially output active scanning signals to the scanning signal lines by sequentially setting a plurality of cascaded unit circuits having a first state and a second to the first state;

a data signal line driver circuit to apply image signals to the data signal lines and thereby writing the image signals to the pixel forming portions that are connected to scanning signal lines being selected;

a power supply circuit including a first voltage generation portion to generate a high-level voltage and a second voltage generation portion to generate a low-level voltage;

a display control circuit, in accordance with a first control signal and image data, to generate a second control signal and a third control signal, the first control signal and the image data being externally transmitted, the second control signal controlling the operation of the scanning signal line driver circuit, the third control signal controlling the operation of the data signal line driver circuit; and a level shifter to output the second control signal provided by the display control circuit to the scanning signal line driver circuit after adjusting the level of the second control signal in accordance with the high-level voltage provided by the first voltage generation portion and the low-level voltage provided by the second voltage generation portion, wherein, each of the unit circuits includes a plurality of nodes and a plurality of thin-film transistors connected to the nodes at gate terminals, the nodes in a floating state during the pause period, the level shifter outputs the active scanning signals, such that the scanning signal line driver circuit applies the active scanning signals sequentially to the scanning signal lines, during the drive period, and then provides an active clear signal generated on the basis of the high-level voltage and the low-level voltage, simultaneously to the unit circuits, thereby setting voltages of the nodes to a reference voltage before a transition to the pause period, the display control circuit includes a selection signal generation portion to generate an active selection signal to cause the power supply circuit and the level shifter to operate, the selection signal generation portion outputs the active selection signal to the power supply circuit and the level shifter during the drive period, and also outputs an inactive selection signal during the pause period, the power supply circuit causes the first and the second voltage generation portions to operate and output the high-level and the low-level voltages to the level shifter in accordance with the active selection signal during the drive period, and also stops the operation of the first voltage generation portion in accordance with the inactive selection signal during the pause period while causing the second voltage generation portion to operate and output the low-level voltage to the level shifter, and the level shifter stops operating during the pause period, thereby fixing a voltage of a line connecting the level shifter and the scanning signal line driver circuit at low level.

7. The display device according to claim 6, wherein, the selection signal generation portion generates the active selection signal in predetermined cycles during the pause period, and provides the active selection signal to the power supply circuit and the level shifter, and the level shifter sets the voltages of the nodes to the reference voltage during the pause period by providing the active clear signal simultaneously to the unit circuits, the active clear signal being a signal generated on the basis of the high-level and the low-level voltages respectively provided by the first and the second voltage generation portions.

8. The display device according to claim 1, wherein the pixel forming portions and the unit circuits include thin-film transistors whose semiconductor layers are made from In—Ga—Zn—O mainly composed of indium (In), gallium (Ga), zinc (Zn), and oxygen (O).

9. A method for driving a display device performing pause drive which alternates between a drive period and a pause period in predetermined cycles, wherein, the display device includes:
- a plurality of scanning signal lines and a plurality of data signal lines crossing the scanning signal lines;
- a plurality of pixel forming portions arranged in a matrix corresponding to respective crossings of the scanning signal lines and the data signal lines;
- a scanning signal line driver circuit including a shift register to sequentially output active scanning signals to the scanning signal lines by sequentially setting a plurality of cascaded unit circuits having a first state and a second state to the first state in accordance with first clock signals and second clock signals;
- a data signal line driver circuit to apply image signals to the data signal lines and thereby writing the image signals to the pixel forming portions that are connected to scanning signal lines being selected;
- a power supply circuit including a first voltage generation portion to generate a high-level voltage and a second voltage generation portion to generate a low-level voltage;
- a display control circuit, in accordance with a first control signal and image data, to generate a second control signal and a third control signal, the first control signal and the image data being externally transmitted, the second control signal controlling the operation of the scanning signal line driver circuit, the third control signal controlling the operation of the data signal line driver circuit; and
- a level shifter to output the second control signal provided by the display control circuit to the scanning signal line driver circuit after adjusting the level of the second control signal in accordance with the high-level voltage provided by the first voltage generation portion and the low-level voltage provided by the second voltage generation portion, wherein each of the unit circuits includes a plurality of nodes and a plurality of thin-film transistors connected to the nodes at gate terminals, the nodes set in a floating state during the pause period, the level shifter outputs the active scanning signals, such that the scanning signal line driver circuit applies the active scanning signals sequentially to the scanning signal lines, during the drive period, and then provides an active clear signal generated on the basis of the high-level voltage and the low-level voltage, simultaneously to the unit circuits, thereby setting voltages of the nodes to a reference voltage before a transition to the pause period, the level shifter provides the second control signal to the scanning signal line driver circuit during the pause period, the second control signal being a low-level signal generated on the basis of the high-level and the low-level voltages respectively provided by the first and the second voltage generation portions, and the level shifter generates the active clear signal in predetermined cycles during the pause period, and provides the active clear signal simultaneously to the unit circuits, thereby setting the voltages of the nodes to the reference voltage, the method comprising:
- applying the active scanning signals sequentially to the scanning signal lines during the drive period;
- providing an active clear signal generated on the basis of the high-level and the low-level voltages outputted by the power supply circuit, simultaneously to the unit circuits at the end of the drive period, thereby simultaneously setting voltages of the nodes to a reference voltage; and
- transitioning to the pause period after the end of the drive period.

10. The display device according to claim 4, wherein, the nodes include first nodes and second nodes, the thin-film transistors include output thin-film transistors to output the active scanning signals and discharge thin-film transistors to set voltages of the first nodes to the reference voltage, the output thin-film transistors being connected to the first nodes at the gate terminals, the discharge thin-film transistors being connected to the second nodes at the gate terminals, and the active clear signal causes the voltages of the first and the second nodes included in the unit circuits to be simultaneously set to the reference voltage.

11. The display device according to claim 10, wherein, the unit circuits are sequentially set into the first state in accordance with first clocks and second clocks, the output thin-film transistors output the first clocks as the active scanning signals, the discharge thin-film transistors are set in an ON state when the second clocks become active, thereby setting the voltages of the first nodes to the reference voltage, and the level shifter outputs the first clocks and the second clocks during the drive period, such that the scanning signal line driver circuit applies the active scanning signals sequentially to the scanning signal lines.

12. The display device according to claim 4, wherein the pixel forming portions and the unit circuits include thin-film transistors whose semiconductor layers are made from In—Ga—Zn—O mainly composed of indium (In), gallium (Ga), zinc (Zn), and oxygen (O).

13. The display device according to claim 6, wherein, the nodes include first nodes and second nodes, the thin-film transistors include output thin-film transistors to output the active scanning signals and discharge thin-film transistors to set voltages of the first nodes to the reference voltage, the output thin-film transistors being connected to the first nodes at the gate terminals, the discharge thin-film transistors being connected to the second nodes at the gate terminals, and the active clear signal causes the voltages of the first and the second nodes included in the unit circuits to be simultaneously set to the reference voltage.

14. The display device according to claim 13, wherein, the unit circuits are sequentially set into the first state in accordance with first clocks and second clocks, the output thin-film transistors output the first clocks as the active scanning signals, the discharge thin-film transistors are set in an ON state when the second clocks become active, thereby setting the voltages of the first nodes to the reference voltage, and the level shifter outputs the first clocks and the second clocks during the drive period, such that the scanning signal line driver circuit applies the active scanning signals sequentially to the scanning signal lines.

15. The display device according to claim 6, wherein the pixel forming portions and the unit circuits include thin-film transistors whose semiconductor layers are made from In—Ga—Zn—O mainly composed of indium (In), gallium (Ga), zinc (Zn), and oxygen (O).

* * * * *